US012228339B2

(12) United States Patent
Yum et al.

(10) Patent No.: US 12,228,339 B2
(45) Date of Patent: *Feb. 18, 2025

(54) DRYING APPARATUS FOR POWDER RAW MATERIAL FOR MANUFACTURING SECONDARY CELL WITH ELECTRIC HEATER

(71) Applicants: KANGWON E-SOLUTION, Busan (KR); KANGWON ENERGY CO., LTD., Jeollabuk-do (KR)

(72) Inventors: Seung Hoon Yum, Gyeongsangnam-do (KR); Nam Geol Lee, Gyeongsangnam-do (KR)

(73) Assignees: KANGWON E-SOLUTION, Busan (KR); KANGWON ENERGY CO., LTD., Jeollabuk-Do (KR)

( * ) Notice: Subject to any disclaimer, the term of this patent is extended or adjusted under 35 U.S.C. 154(b) by 37 days.

This patent is subject to a terminal disclaimer.

(21) Appl. No.: 17/952,113

(22) Filed: Sep. 23, 2022

(65) Prior Publication Data
US 2023/0221072 A1    Jul. 13, 2023

(30) Foreign Application Priority Data
Jan. 11, 2022   (KR) .................. 10-2022-0004341

(51) Int. Cl.
*F26B 9/08*   (2006.01)
*F26B 3/20*   (2006.01)
(Continued)

(52) U.S. Cl.
CPC .............. *F26B 9/082* (2013.01); *F26B 3/20* (2013.01); *F26B 3/24* (2013.01); *F26B 9/063* (2013.01);
(Continued)

(58) Field of Classification Search
CPC .... F26B 9/082; F26B 3/20; F26B 3/24; F26B 9/063; F26B 11/14; F26B 21/10;
(Continued)

(56) References Cited

U.S. PATENT DOCUMENTS 2,483,324 A * 9/1949 Peterson ............. F26B 11/0445
34/602
5,531,034 A    7/1996 Mentz
(Continued)

FOREIGN PATENT DOCUMENTS

CN   207019441 U  *  2/2018
CN   112076846 A     12/2020
(Continued)

OTHER PUBLICATIONS

Translation, KR-101580997-B1 (Year: 2015).*
(Continued)

*Primary Examiner* — Jessica Yuen
(74) *Attorney, Agent, or Firm* — Heidi Eisenhut; LOZA & LOZA, LLP

(57) ABSTRACT

The present disclosure relates to a drying apparatus for a powder raw material for manufacturing a secondary cell with an electric heater. In an embodiment of the present disclosure, a plurality of independently controlled heaters are mounted on a main body of an apparatus in which a plurality of heating regions are defined, and the temperature deviation of the internal chamber can reduce by providing the amount of heat supplied to each heating region through the control of the plurality of heaters. The main body of the apparatus includes a cylindrical portion in which the powder raw material is accommodated and sidewalls on both sides of the cylindrical portion, and by installing heaters on the
(Continued)

cylindrical portion and the sidewalls, respectively, the entire region defining the main body of the apparatus can be evenly heated.

29 Claims, 15 Drawing Sheets

(51) Int. Cl.
    *F26B 3/24*     (2006.01)
    *F26B 9/06*     (2006.01)
    *F26B 11/14*     (2006.01)
    *F26B 21/10*     (2006.01)
    *F26B 25/12*     (2006.01)

(52) U.S. Cl.
    CPC .............. *F26B 11/14* (2013.01); *F26B 21/10* (2013.01); *F26B 25/12* (2013.01)

(58) Field of Classification Search
    CPC ........ F26B 25/12; F26B 2200/08; F26B 1/00; F26B 23/04; F26B 23/06; F26B 25/002; F26B 25/16; F26B 11/16; F26B 11/0445; F26B 5/04; F26B 21/003; F26B 25/04; Y02E 60/10; H01M 4/36; H05B 3/56
    See application file for complete search history.

(56) References Cited

U.S. PATENT DOCUMENTS

| | | | | |
|---|---|---|---|---|
| 2011/0078915 A1* | 4/2011 | Kim | ........................ | A23L 3/40 |
| | | | | 251/129.01 |
| 2012/0260518 A1* | 10/2012 | Melgaard | .................. | F26B 3/30 |
| | | | | 34/526 |
| 2017/0016371 A1* | 1/2017 | Schlipf | .................... | H05B 3/48 |

FOREIGN PATENT DOCUMENTS

| | | | | | |
|---|---|---|---|---|---|
| JP | 2010281563 | A | | 12/2010 | |
| JP | 2011127798 | A | | 6/2011 | |
| KR | 1020130105432 | B1 | | 9/2013 | |
| KR | 101399710 | B1 | * | 5/2014 | |
| KR | 101580997 | B1 | * | 12/2015 | |
| KR | 101834822 | B1 | | 3/2018 | |
| KR | 102028654 | B1 | | 10/2019 | |
| KR | 102069468 | B1 | | 1/2020 | |
| KR | 102255987 | B1 | | 5/2021 | |
| KR | 102262101 | B1 | | 6/2021 | |
| RO | 130103 | A2 | * | 3/2015 | |
| WO | WO-02069671 | A2 | * | 9/2002 | ............... H01R 4/14 |
| WO | 2020245378 | A1 | | 12/2020 | |
| WO | 2021040753 | A1 | | 3/2021 | |

OTHER PUBLICATIONS

Translation, CN-207019441-U (Year: 2018).*
Translation, RO-130103-A2 (Year: 2015).*
Translation, KR-101399710-B1 (Year: 2014).*
Corresponding HU App. No. P2200386. Search Report (Mar. 22, 2023).
Corresponding KR App. No. 10-2022-0004341. Office Action (machine translation) (Dec. 4, 2022).

* cited by examiner

DRYING APPARATUS FOR POWDER RAW MATERIAL FOR MANUFACTURING SECONDARY CELL WITH ELECTRIC HEATER

CROSS-REFERENCE TO RELATED APPLICATION

This application claims under 35 U.S.C. § 119 to Korean Patent Application No. 10-2022-0004341 filed Jan. 11, 2022, which is hereby incorporated by reference in its entirety.

BACKGROUND

The present disclosure relates to a drying apparatus for a powder raw material for manufacturing a secondary cell with an electric heater.

A secondary cell is a device that can be used semi-permanently through charging, is advantageous in realizing light and high capacity, and thus can be used from power tools to home appliances, electric vehicles, power plants, and the like.

The secondary cell includes an anode material, a cathode material, a separator, an electrolyte, and the like and among them, the cathode material and the anode material are the most core materials that determine the capacity, lifespan, and charging rate of the cell.

The cathode material may include an active material such as lithium, cobalt, and manganese, a conductive material such as graphite, a binder, a current collector, and the like and may be manufactured by drying and then pressing a powder raw material mixed with an active material, a conductive material, and a binder in the current collector.

The anode material may include an active material such as graphite, a conductive material, a binder, a current collector, and the like and may be manufactured by drying and then pressing a powder raw material in which an active material, a conductive material, and a binder are mixed in the current collector.

The drying process of the powder raw material may be understood as an important process for improving the quality of the cathode material by removing moisture contained in the powder raw material.

Conventionally, a drying apparatus in which heated thermal medium oil circulates as a heat source is used for drying the cathode material or the anode material.

When the thermal medium oil is used in the drying apparatus, maintenance work is required to improve the carbonization phenomenon in the heating jacket, and since the thermal medium oil must be periodically replaced, maintenance is cumbersome and expensive.

In addition, due to the characteristics of the thermal medium oil, the maximum heating temperature is limited to about 340° C., so the drying process time is too long, and thus productivity is lowered.

In addition, a phenomenon in which the circulating thermal medium oil is leaked from the drying apparatus is occurred frequently.

SUMMARY

An object of the present disclosure is to provide a drying apparatus for a powder raw material for manufacturing a secondary cell that performs drying using an electric heater so as to increase the using temperature range.

An object of the present disclosure is to provide a drying apparatus for a powder raw material for manufacturing a secondary cell in which the electric heater is disposed on the outer circumferential surface of the main body of the apparatus and the chamber inside the drying apparatus is heated through conduction and radiant heat.

An object of the present disclosure is to provide a drying apparatus for a powder raw material for manufacturing a secondary cell in which the outer circumferential surface of the main body of the apparatus is partitioned into a plurality of heating regions, and independently controlled heaters are disposed in the partitioned heating regions, and thus the entire region of the chamber may be evenly heated and the temperature deviation may be reduced.

An object of the present disclosure is to provide a drying apparatus for a powder raw material for manufacturing a secondary cell in which temperature sensors are disposed outside and inside a chamber, respectively, and the output of a heater can be controlled based on a temperature value detected by the temperature sensor.

In particular, an object of the present disclosure is to provide a drying apparatus for a powder raw material for manufacturing a secondary cell in which a first temperature sensor capable of detecting the temperature of the chamber is disposed inside the chamber, and a second temperature sensor capable of detecting the temperature of the heater is disposed outside the chamber, and the output all the plurality of heater or some of heaters can be controlled based the temperature value detected by the first and second temperature sensors.

An object of the present disclosure is to provide a drying apparatus for a powder raw material for manufacturing a secondary cell which can improve drying performance by mounting a heater not only on the main body of the apparatus in which the powdered raw material is accommodated, but also on the exhaust port from which the dried powdered raw material is discharged or the exhaust port from which the exhaust is made.

An object of the present disclosure is to provide a drying apparatus for a powder raw material for manufacturing a secondary cell in which a cable-type heater can be wrapped or bent around the outer circumferential surface so that a sufficient amount of heat can be supplied to the outer circumferential surface of the main body of the apparatus.

An object of the present disclosure is to provide a drying apparatus for a powder raw material for manufacturing a secondary cell which provides a fixing device for fixing the heater to the outer circumferential surface so that the heater can be positioned in contact with or adjacent to the outer circumferential surface of the main body of the apparatus.

An object of the present disclosure is to provide a drying apparatus for a powder raw material for manufacturing a secondary cell in which a temperature sensor can be disposed in contact with or adjacent to the outer surface of the heater so as to be capable of easily detecting the temperature of the heater.

An object of the present disclosure is to provide a drying apparatus for a powder raw material for manufacturing a secondary cell which is provided with a control panel capable of monitoring the temperature values of a plurality of heaters and the temperature values inside the chamber in real time, providing an alarm when the temperature value is out of a set range, and controlling the on/off of the drying apparatus.

In an embodiment of the present disclosure, a plurality of independently controlled heaters are mounted on a main body of an apparatus in which a plurality of heating regions are defined, and the temperature deviation of the internal chamber can reduce by providing the amount of heat supplied to each heating region through the control of the plurality of heaters.

The main body of the apparatus includes a cylindrical portion in which the powder raw material is accommodated and sidewalls on both sides of the cylindrical portion, and by installing heaters on the cylindrical portion and the sidewalls, respectively, the entire region defining the main body of the apparatus can be evenly heated.

By installing a heater in the discharge port for discharging the dried powder raw material provided in the main body of the apparatus or the exhaust port for discharging moisture and air in the chamber, it is possible to provide the amount of heat of the heater even to the path through which the powder raw material can move.

The embodiment of the present disclosure can effectively heat the outer circumferential surface by disposing the cable-type heater on the outer circumferential surface of the main body of the apparatus.

According to an embodiment of the present disclosure, the area of the heater may increase by wrapping or bending the cable-type heater around the outer circumferential surface of the main body of the apparatus.

An embodiment of the present disclosure includes a heater fixing device to fix heaters arranged in a plurality of rows to the outer surface of the main body of the apparatus, wherein the heater fixing device may be configured to press the heaters constituting two or more rows to the outer surface of the main body of the apparatus at a time.

In an embodiment of the present disclosure, a first temperature sensor (chamber temperature sensor) capable of detecting the chamber temperature inside the main body of the apparatus is installed inside the chamber to be utilized as a factor value capable of controlling the temperature of the chamber.

A plurality of the first temperature sensor may be provided to detect a temperature for each position of the chamber and adjust the amount of heat supplied from the heater in a region of the chamber deviating from a set temperature as a result of the detection.

In an embodiment of the present disclosure, a second temperature sensor (heater temperature sensor) capable of detecting the temperature of the heater is installed on the outer surface of the main body of the apparatus, and the output of all or some of the plurality of heaters can be adjusted by using the temperature value detected by the second temperature sensor and the temperature value detected by the first temperature sensor.

An embodiment of the present disclosure may include a sensor fixing device for fixing the sensor so that the second temperature sensor can be disposed in contact with or adjacent to the outer surface of the heater.

A drying apparatus for a powder raw material for manufacturing a secondary cell with an electric heater according to an embodiment of the present disclosure may include a main body of the apparatus forming a chamber in which the powder raw material is accommodated; a rotation shaft provided rotatably inside the main body of the apparatus and on which a blade is mounted for agitation of the powder raw material; and an electric heater installed on the outer surface of the main body of the apparatus and providing heat so that the powder raw material is dried.

The main body of the apparatus may include a cylindrical portion accommodating the rotation shaft and having a cylindrical shape, and first and second sidewalls forming both sidewalls of the cylindrical portion, and the cylindrical portion and the first and second sidewalls may include a plurality of heating regions partitioned to be heated by the electric heater.

The electric heater may include a plurality of heaters disposed in the plurality of heating regions and independently controllable with different outputs from each other.

The cylindrical portion may include a lower heating region defining a heating region of a portion of the plurality of heating regions and positioned below the rotation shaft; and an upper heating region defining a heating region of another portion of the plurality of heating regions and is positioned above the rotation shaft.

The plurality of heaters may be configured such that a heater installed in the lower heating region and a heater installed in the upper heating region are independently controlled.

The cylindrical portion may include a right heating region defining a heating region of a portion of the plurality of heating regions and positioned adjacent to the first sidewall than the second sidewall based on an axial center of the cylindrical portion; and a left heating region defining a heating region of another portion of the plurality of heating regions and positioned adjacent to the second sidewall than the first sidewall based on the axial center of the cylindrical portion.

The plurality of heaters may be configured such that a heater installed in the right heating region and a heater installed in the left heating region are independently controlled.

The plurality of heating regions may include at least two or more cylindrical portion heating regions formed in the cylindrical portion, a first sidewall heating region formed on the first sidewall, and a second sidewall heating region formed on the second sidewall.

The plurality of heaters may be installed in the cylindrical portion heating region, the first sidewall heating region, and the second sidewall heating region.

The cylindrical portion heating region may include a first heating region adjacent to the second sidewall based on the axial center of the cylindrical portion and formed at a position higher than the rotation shaft; and a second heating region adjacent to the first sidewall based on the axial center of the cylindrical portion and formed at a position higher than the rotation shaft.

The cylindrical portion heating region may include a third heating region adjacent to the second sidewall based on the axial center of the cylindrical portion and formed at a position lower than the rotation shaft; and a fourth heating region adjacent to the first sidewall based on the axial center of the cylindrical portion and formed at a lower position than the rotation shaft.

The output amount of the heaters disposed in the third and fourth heating regions may be formed to be greater than the output amount of the heaters disposed in the first and second heating regions.

The first to fourth heating regions form a front portion of the cylindrical portion, and the cylindrical portion heating region formed in the rear portion of the cylindrical portion may include a fifth heating region adjacent to the first sidewall based on the axial center of the cylindrical portion and formed at a position higher than the rotation shaft; and a sixth heating region adjacent to the second sidewall based on the axial center of the cylindrical portion and formed at a position higher than the rotation shaft.

The cylindrical portion heating region may include a seventh heating region adjacent to the first sidewall based on the axial center of the cylindrical portion and formed at a position lower than the rotation shaft; and an eighth heating region adjacent to the second sidewall based on the axial center of the cylindrical portion and formed at a position lower than the rotation shaft.

The output amount of the heater disposed in the seventh and eighth heating regions may be formed to be greater than the output amount of the heater disposed in the fifth and sixth heating regions.

The cylindrical portion may be a partition member provided so as to protrude from the outer circumferential surface of the cylindrical portion and for partitioning the heating region of the at least two or more cylindrical portions.

The partition member may include a first partition member extending from the outer circumferential surface of the cylindrical portion in a circumferential direction to divide the outer circumferential surface of the cylindrical portion in left and right directions in two; and a second partition member disposed to intersect the first partition member to divide the outer circumferential surface of the cylindrical portion in vertical or front and rear direction in two.

A plurality of second partition members may be provided.

At least one of the at least two or more cylindrical portion heating regions may be a heating region defined by the first and second partition members and the first sidewall, and the other at least one of the at least two or more cylindrical portion heating regions may be a heating region defined by the first and second partition members and the second sidewall.

The drying apparatus for a powder raw material for manufacturing a secondary cell with an electric heater may further include an input port provided at an upper end of the main body of the apparatus and configured to input a powder raw material into the chamber; a discharge port provided at the lower end of the main body of the apparatus and configured to discharge the powder raw material dried in the chamber; an exhaust port provided at an upper end of the main body of the apparatus and configured to discharge moisture or air from the chamber; and a filter device connected to the exhaust port and configured to collect the powder raw material discharged through the exhaust port.

The electric heater may be further disposed in at least one of the discharge port, the exhaust port, and the filter device.

With respect to the installation surface of the main body of the apparatus on which the electric heater is installed, the amount of the electric heater installed per unit area of the installation surface may be, with respect to the installation surface of at least one of the discharge port, the exhaust port, and the filter device, larger than the amount of the electric heater installed per unit area of the installation surface.

The output of the electric heater installed in the main body of the apparatus may be formed larger than the output of the electric heater installed in at least one of the discharge port, the exhaust port and the filter device.

The electric heater may include a cable-type heater, and the heater may be wrapped around the installation surface of the main body of the apparatus, extended by bending, or installed to be round with a spiral shape.

The electric heater may be composed of a mineral insulated heating cable (MI heating cable).

The electric heater may include a first part extending in the axial direction to have a zigzag shape and including a plurality of heater lines, and a second part having a bending part bent to change the extension direction in the first part, and may further include a heater fixing device for fixing the electric heater to the main body of the apparatus.

The heater fixing device may include a bolt inserted into the installation surface of the main body of the apparatus and disposed between first and second heater lines of the plurality of heater lines, spaced apart from each other; a washer into which the bolt is inserted and which covers at least a portion of the first and second heater lines; and a nut fastened to the bolt and presses the washer toward the first and second heater lines.

The outer diameter $d1$ of the washer may be formed to be larger than the sum of the outer diameter $d2$ of the first heater line and the outer diameter $d3$ of the second heater line.

The heater fixing device may include a bolt inserted into the installation surface of the main body of the apparatus and disposed between first and second heater lines of the plurality of heater lines, spaced apart from each other; a bracket into which the bolt is inserted and forming a groove portion covering at least a portion of the first heater line; and a nut fastened to the bolt and pressing the bracket toward the first heater line.

The drying apparatus for a powder raw material for manufacturing a secondary cell with an electric heater may further include a chamber temperature sensor disposed in the chamber of the main body of the apparatus to detect the temperature of the chamber, and the plurality of heaters may be disposed in the plurality of heating regions to output different outputs from each other based on the temperature value detected by the chamber temperature sensor.

The chamber temperature sensor may be installed at a position lower than the rotation shaft so as to detect the temperature of the lower region of the chamber.

The chamber temperature sensor may include a first chamber temperature sensor disposed in a left region more adjacent to the second sidewall than to the first sidewall based on the axial center of the main body of the apparatus; and a second chamber temperature sensor disposed in a right region more adjacent to the first sidewall than to the second sidewall based on the axial center of the main body of the apparatus.

The drying apparatus for a powder raw material for manufacturing a secondary cell with an electric heater may further include a plurality of heater temperature sensors disposed in the plurality of heating regions and configured to detect the temperature of the plurality of heaters, and the plurality of heaters may be disposed in the plurality of heating regions to output different outputs from each other based on the temperature values detected by the first and second chamber temperature sensors and the plurality of heater temperature sensors.

The drying apparatus for a powder raw material for manufacturing a secondary cell with an electric heater may further include a heater fixing device configured to fix the heater temperature sensor to the main body of the apparatus so that the heater temperature sensor is placed in contact with the heater or adjacent to the heater.

The heater fixing device may include a first accommodation portion accommodating the first heater line of the heater and the heater temperature sensor, and a second accommodation portion accommodating the second heater line of the heater, and the first and second accommodation portions may be fastened to the main body of the apparatus through a fastening mechanism.

The drying apparatus for a powder raw material for manufacturing a secondary cell with an electric heater may further include a controller for controlling the plurality of heaters based on the temperature values detected by the first and second chamber temperature sensors and the plurality of heater temperature sensors.

When it is recognized that the temperature value detected by the first chamber temperature sensor or the second chamber temperature sensor is out of the set range, the controller may control to change the output value of the heater positioned in the heating region adjacent to the installation position of the first chamber temperature sensor or the second chamber temperature sensor.

When it is recognized that the deviation of the temperature values T1 and T2 detected by the first and second chamber temperature sensors is out of the set deviation, the controller may control to decrease the output of the heater positioned adjacent to the heating region having a high temperature value or to increase the output of the heater positioned adjacent to the heating region having a low temperature value, among the detection values of the first and second chamber temperature sensors.

The drying apparatus for a powder raw material for manufacturing a secondary cell with an electric heater may further include an outer cover covering the outside of the device body; a heat insulating material provided inside the outer cover and preventing heat generated by the plurality of heaters from being radiated to the outside; and a heat transfer sheet provided between the heat insulating material and the plurality of heaters and configured to transfer the heat generated by the plurality of heaters to the main body of the apparatus.

So that the heat transfer rate of the heat transfer sheet is greater than the heat transfer rate of the main body of the apparatus, the main body of the apparatus may be made of a stainless steel material, and the heat transfer sheet is made of an aluminum material.

According to an embodiment of the present disclosure, since drying can be performed using an electric heater to increase the using temperature range, drying performance and efficiency can be improved.

According to an embodiment of the present disclosure, by disposing the electric heater on the outer circumferential surface of the main body of the apparatus, the chamber inside the drying apparatus can be easily heated through conduction and radiant heat.

According to an embodiment of the present disclosure, by partitioning the outer circumferential surface of the main body of the apparatus into a plurality of heating regions and disposing independently controlled heaters in the partitioned heating regions, it is possible to evenly heat the entire region of the chamber and reduce temperature deviation.

According to an embodiment of the present disclosure, temperature sensors may be disposed outside and inside the chamber, respectively, and the output of the heater may be easily controlled based on the temperature value detected by the temperature sensor.

According to an embodiment of the present disclosure, by disposing a first temperature sensor capable of sensing the temperature of the chamber inside the chamber, and disposing a second temperature sensor capable of sensing the temperature of the heater outside the chamber, based on the temperature value detected by the first and second temperature sensors, it is possible to easily adjust the output of all or some of the plurality of heaters.

According to an embodiment of the present disclosure, drying performance can be improved by mounting a heater not only on the main body of the apparatus in which the powdered raw material is accommodated, but also on the discharge port from which the dried powdered raw material is discharged or the exhaust port from which the exhaust is made.

According to an embodiment of the present disclosure, a cable-type heater is disposed in a state of being wrapped or bent around the outer circumferential surface so that a sufficient amount of heat can be supplied to the outer circumferential surface of the main body of the apparatus.

According to an embodiment of the present disclosure, by providing a fixing device for fixing the heater to the outer circumferential surface, the heater can be positioned in contact with or adjacent to the outer circumferential surface of the main body of the apparatus, thereby improving the heating performance of the main body of the apparatus.

According to an embodiment of the present disclosure, the temperature sensor is disposed in contact with or adjacent to the outer surface of the heater, so that the temperature of the heater can be easily detected.

According to an embodiment of the present disclosure, the control panel which can monitor the temperature value of a plurality of heaters and the temperature value inside the chamber in real time, and when the temperature value is out of a set range, provide an alarm and control the on/off of the drying apparatus, and thus convenience of use is improved and safety accidents can be prevented in advance.

DETAILED DESCRIPTION OF THE EMBODIMENTS

Figure 1:
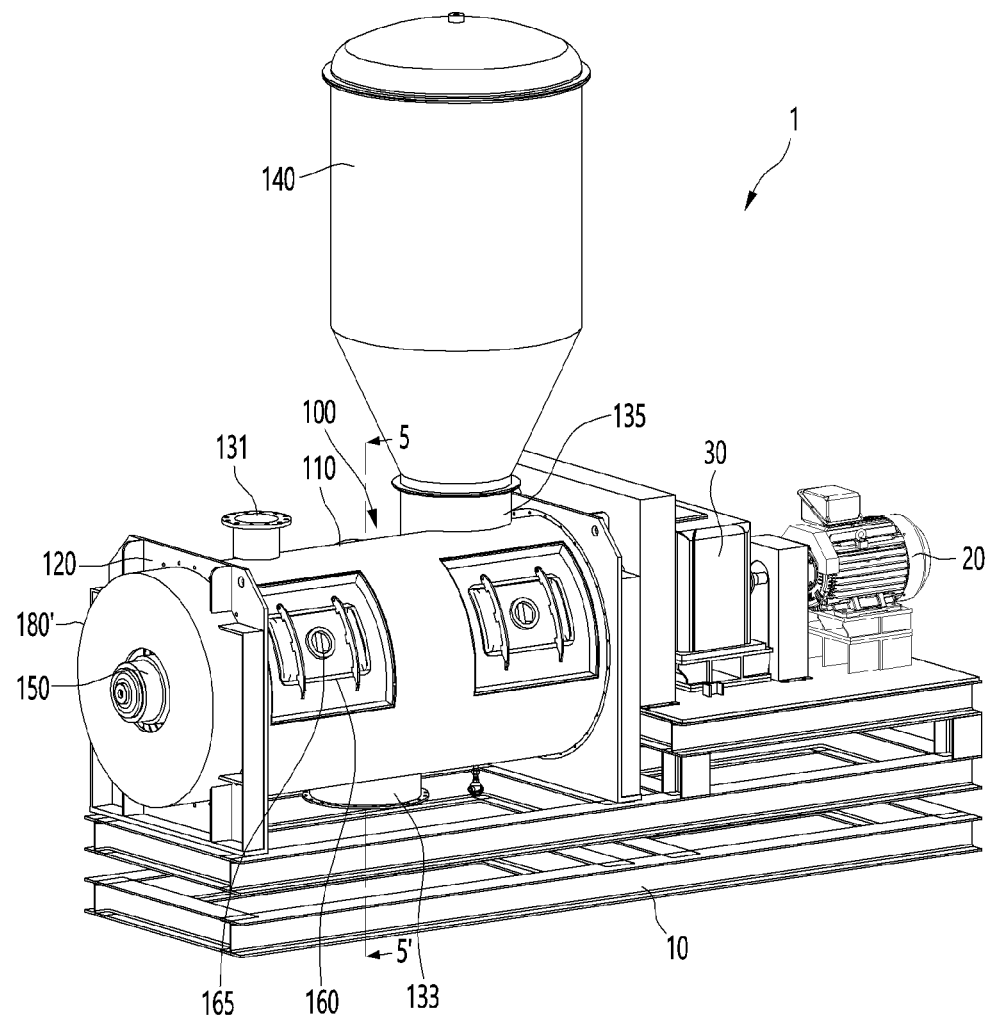
FIG. 1 is a perspective view illustrating the configuration of a drying apparatus according to an embodiment of the present disclosure.

Hereinafter, some embodiments of the present disclosure will be described in detail with reference to exemplary drawings. In adding reference numerals to the components of each drawing, it should be noted that the same components are given the same reference numerals as much as possible even though they are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), and (b) may be used. These terms are only for distinguishing the component from other components, and the essence, order, or sequence of the component is not limited by the term. When it is described that a component is "connected", "coupled" or "accessed" to another component. It will be understood that the component may be directly connected or assessed to the other component, but another component may be "connected", "coupled" or "accessed" between each component.

Figure 2:
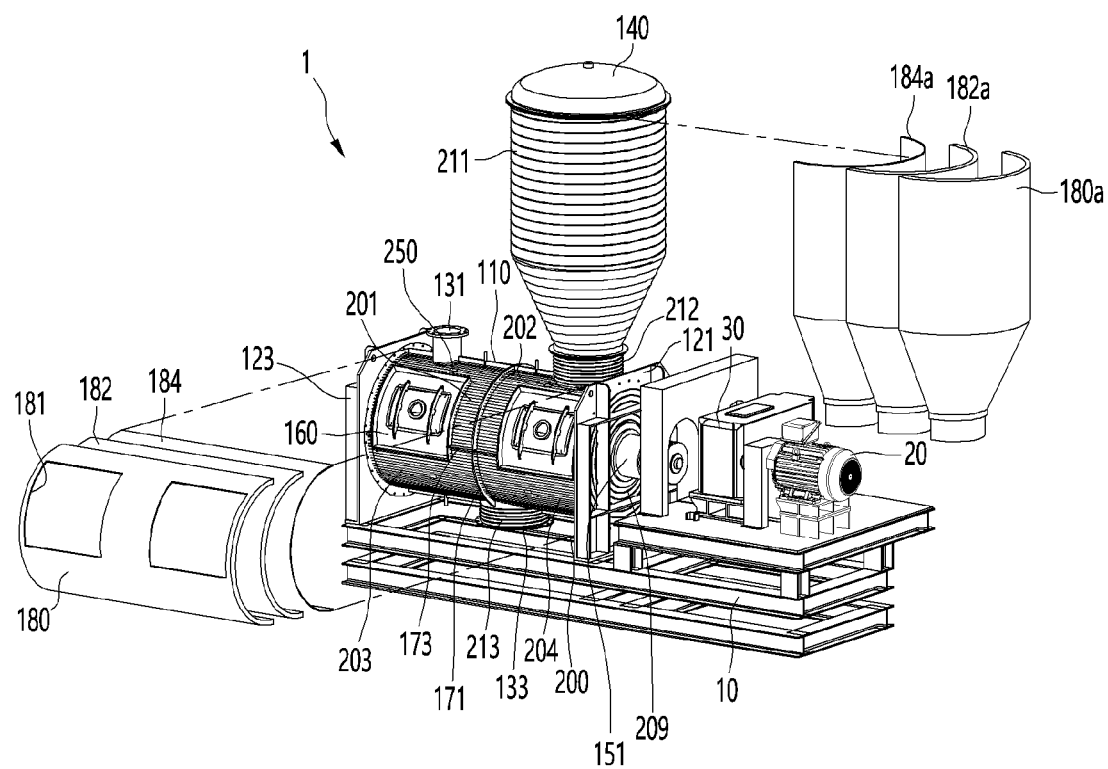
FIG. 2 is a partially exploded perspective view illustrating the configuration of a drying apparatus according to an embodiment of the present disclosure.
Figure 3:
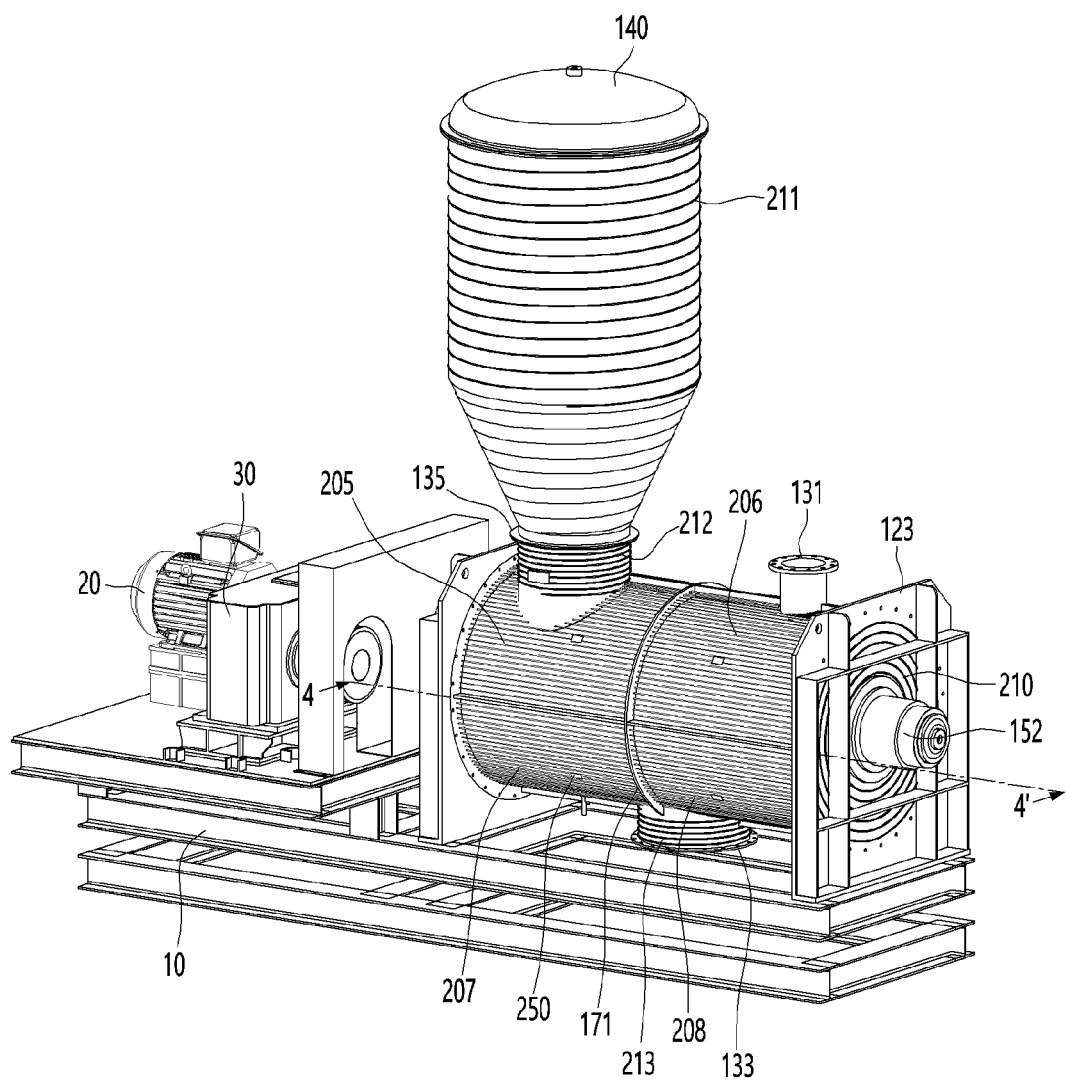
FIG. 3 is a perspective view illustrating a state where a heater is disposed on the outer surface of the main body of the apparatus according to an embodiment of the present disclosure.
Figure 4:
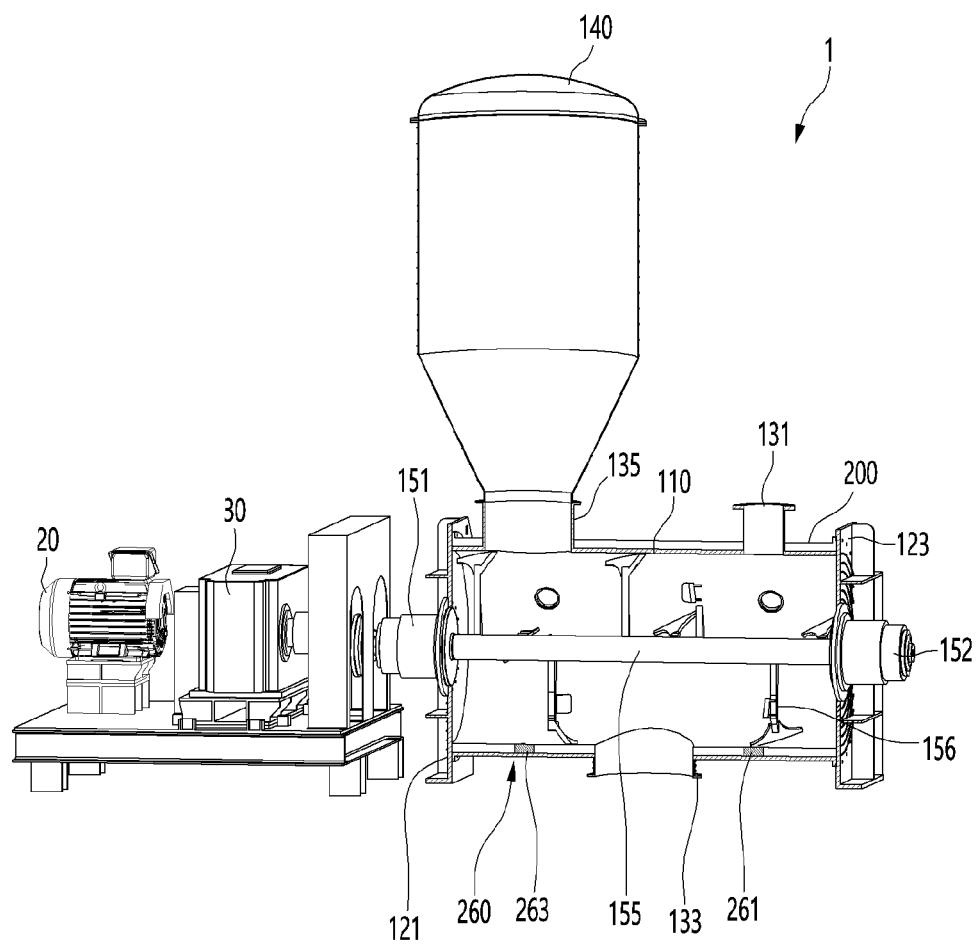
FIG. 4 is a cross-sectional view illustrating the configuration of the drying apparatus, taken along line 4-4' of FIG. 3.
Figure 5:
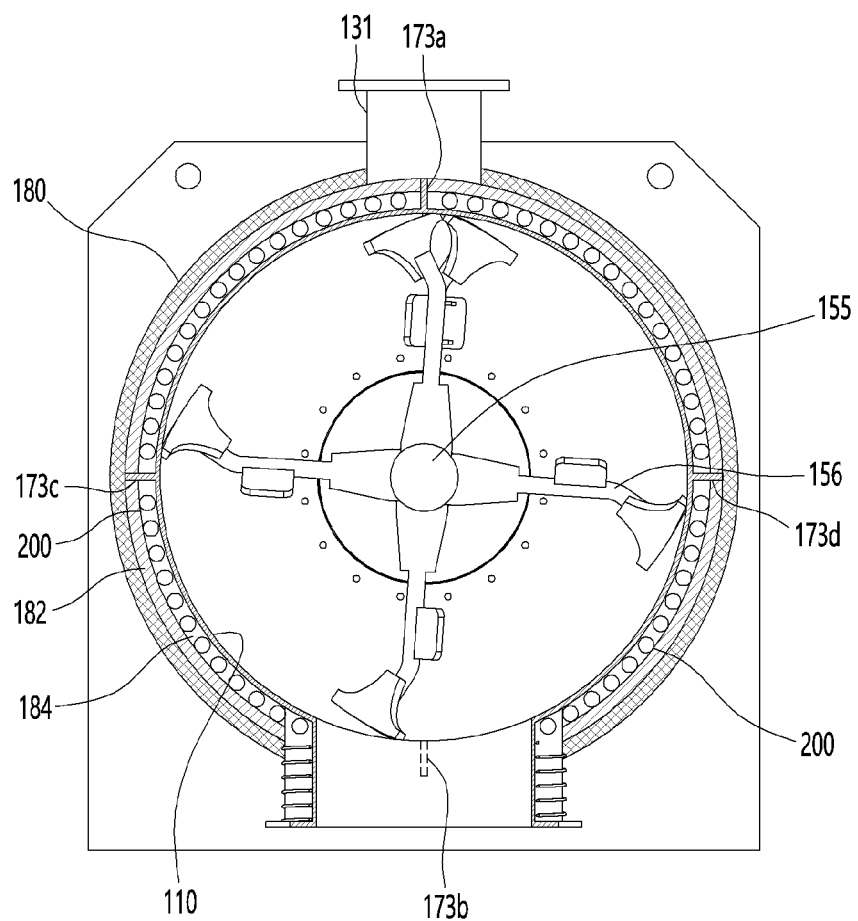
FIG. 5 is a cross-sectional view taken along line 5-5' of FIG. 1.

FIG. 1 is a perspective view illustrating the configuration of a drying apparatus according to an embodiment of the present disclosure, FIG. 2 is a partially exploded perspective view illustrating the configuration of a drying apparatus according to an embodiment of the present disclosure, FIG. 3 is a perspective view illustrating a state where a heater is disposed on the outer surface of the device body according to an embodiment of the present disclosure, FIG. 4 is a cross-sectional view illustrating the configuration of the drying apparatus, taken along line 4-4' of FIG. 3, and FIG. 5 is a cross-sectional view taken along line 5-5' of FIG. 1.

Referring to FIGS. 1 to 5, a drying apparatus for a powder raw material for manufacturing a secondary cell according to an embodiment of the present disclosure (1, hereinafter, referred to as a "drying apparatus") can be understood as an apparatus which dries the cathode material or the anode material provided in the secondary cell.

The drying apparatus 1 may be installed on the base frame 10.

The drying apparatus 1 may include driving devices 20 and 30 for generating a driving force and a rotation shaft 155 interlocking with the driving devices 20 and 30, and may include a main body 100 of the apparatus forming a drying chamber (Hereinafter, chamber) in which powder raw materials of the cathode material or the anode material are accommodated.

The driving devices 20 and 30 may include a driving motor 20 and a speed reducer 30 that is shaft-connected to the driving motor 20 to reduce the rotational speed.

The rotation shaft 155 may protrude to the side of the main body 100 of the apparatus and interlock with the speed reducer 30.

The rotation shaft 155 may extend in an axial direction inside the main body 100 of the apparatus, that is, in a direction from the first sidewall 121 to the second sidewall 123 of the main body 100 of the apparatus.

Shaft support portions 150 for supporting the rotation shaft 155 may be provided on both sides of the main body 100 of the apparatus. The shaft support portion 150 may include a bearing for supporting the outer circumferential surface of the rotation shaft 155.

The shaft support portion 150 may be configured to protrude from both sidewalls of the main body 100 of the apparatus.

The shaft support portion 150 may include a first shaft support portion 151 protruding from one sidewall of the main body 100 of the apparatus toward the speed reducer 30.

For example, the first shaft support portion 151 may protrude from the first side wall 121. One side portion of the rotation shaft 155 may pass through the first side wall 121 and the first shaft support portion 151 to be connected to the speed reducer 30.

The shaft support portion 150 may include a second shaft support portion 152 protruding to the outside from the other side wall of the main body 100 of the apparatus. For example, the second shaft support portion 152 may protrude from the second side wall 123. The other side portion of the rotation shaft 155 may pass through the second side wall 123 to be supported by the second shaft support portion 152.

One side wall provided with the first shaft support portion 151 and the other side wall provided with the second shaft support portion 152 may form sidewalls facing each other.

As another example, the rotation shaft 155 may be coupled to a separate shaft, and the separate shaft may be configured to pass through the first shaft support portion 151 and be connected to the speed reducer 30.

The rotation shaft 155 may be disposed at an approximate central height based on the vertical height of the main body 100 of the apparatus.

The rotation shaft 155 may be provided with a blade 156 capable of agitating the powder raw material accommodated in the main body 100 of the apparatus. The blade 156 may protrude from the outer surface of the rotation shaft 155 and rotate together with the rotation shaft 155.

A plurality of the blades 156 may be provided, and the plurality of blades 156 may be disposed on the rotation shaft 155 spaced apart from each other in the axial direction.

The main body 100 of the apparatus may include a cylindrical portion 110 having a cylindrical shape. The cylindrical portion 110 may have a shape lying in the horizontal direction and may have a port through which the powder raw material is input and discharged.

The main body 100 of the apparatus may further include sidewalls 120 provided on both sides of the cylindrical portion 110. The side wall 120 may include a first side wall 121 forming a side facing the driving devices 20 and 30 and a second side wall 123 forming an opposite side of the first side wall 121.

The cylindrical portion 110 and the first and second sidewalls 121 and 123 may form a chamber in which the powder raw material is accommodated. The chamber may be understood as a drying chamber that forms a high-temperature environment for drying powder raw materials.

The main body 100 of the apparatus may be made of a stainless steel material having excellent corrosion resistance and excellent stability at high temperatures. For example, the cylindrical portion 110 and the first and second sidewalls 121 and 123 may be made of a stainless steel material.

The main body 100 of the apparatus may include an input port 131 into which the powder raw material is input. The input port 131 is disposed at the upper end portion of the cylindrical portion 110, and the powder raw material may be input into the chamber of the main body 100 of the apparatus through the input port 131.

The powder raw material for manufacturing the cathode material may include an active material such as lithium, cobalt, and manganese, a conductive material such as graphite, a binder, and a current collector.

The main body 100 of the apparatus may include a discharge port 133 through which the dried powder raw material is discharged. The discharge port 133 is disposed at the lower end portion of the cylindrical portion 110, and the dried powder raw material may be discharged to the outside of the chamber of the main body 100 of the apparatus through the discharge port 133.

The main body 100 of the apparatus may further include an discharge port 133 through which moisture and air inside the chamber are discharged. The discharge port 133 may be disposed at an upper end portion of the cylindrical portion 110. The discharge port 133 may be disposed to be spaced apart from the side of the input port 131.

A filter device 140 may be connected to the discharge port 133. The filter device 140 extends above the discharge port 133 and may have a hopper shape. The filter device 140 collects the powder raw material discharged together with the air from the discharge port 133, and the collected powder raw material may fall into the chamber through the discharge port 133.

The discharge port 133 may be fluidly connected to a pump 600 (see FIG. 14) that generates exhaust force. The pump 600 may include a vacuum pump. Since the chamber of the main body 100 of the apparatus can be formed in a vacuum atmosphere by the vacuum pump, it can be adjusted to reduce the drying time and to minimize the moisture content.

In detail, a pump 600 may be connected to the filter device 140. When the pump 600 is driven, an exhaust flow toward the pump 600 may be generated from the chamber of the main body 100 of the apparatus via the filter device 140.

The main body 100 of the apparatus may include a door 160. The door 160 is provided in the cylindrical portion 110 and is configured to open and close the chamber. The door 160 is opened, and the user can enter the chamber to perform repairs and the like.

A plurality of doors 160 may be provided on both sides of the cylindrical portion 110 in the axial direction.

The door 160 may include a see-through portion 165 to check a state of the inside of the chamber.

Referring to FIG. 1, a portion of the cylindrical portion 110 on which the door 160 is disposed may be defined as a "front portion" and a portion opposite the front portion may be defined as a "rear portion".

The drying apparatus 1 may further include an outer cover 180 surrounding the outside of the main body 100 of the apparatus. The outer cover 180 may form the outer appearance of the drying apparatus 1.

The outer cover 180 may be composed of a plurality of covers. Among the plurality of covers, one cover may cover a partial region of the outer circumferential surface of the cylindrical portion 110, and the other cover may cover another region of the outer circumferential surface of the cylindrical portion 110.

For example, in the cover of the plurality of covers covering the outer surface of the cylindrical portion 110 in which the door 150 is positioned, a door opening portion 181 opened so that the door 150 can be exposed to the outside may be formed.

The drying apparatus 1 is provided between the outer surface of the main body 100 of the apparatus and the outer cover 180 and may further include a heat insulating material 182 that prevents the amount of heat acting on the main body 100 of the apparatus from being radiated to the outside.

For example, the heat insulating material 182 may be made of aerogel structurally strong and excellent in heat insulating properties. However, the material of the insulating material will not be limited thereto.

A heat transfer sheet 184 may be disposed on the outer surface of the main body 100 of the apparatus. The heat transfer sheet 184 may be configured to cover the heater 200 provided on the outer surface of the main body 100 of the apparatus.

The heat transfer sheet 184 may be disposed to contact the outer surface of the main body 100 of the apparatus while covering the heater 200. For example, the heat transfer sheet 184 may have a shape that is folded or crumpled to contact the outer surface of the heater 200 and the outer surface of the main body 100 of the apparatus. With this configuration, the heat generated by the heater 200 can be easily transferred to the main body 100 of the apparatus.

The heat transfer sheet 184 may be formed of a sheet made of a metal material having a higher heat transfer rate than that of the main body 100 of the apparatus. For example, the heat transfer sheet 184 may be formed of an aluminum sheet.

The heat transfer sheet 184 may be disposed between the outer surface of the main body 100 of the apparatus and the heat insulating material 182.

The outer cover 180, the heat insulating material 182, and the heat transfer sheet 184 may be collectively referred to as a "cover assembly".

The cover assemblies 180, 182, and 184 may be provided on the outer surface of the cylindrical portion 110 and the outer surface of the first and second sidewalls 121 and 123. By the cover assemblies 180, 182, and 184, the heater 200 provided in the main body 100 of the apparatus can easily supply heat into the chamber of the main body 100 of the apparatus without being exposed to the outside.

The cover assemblies 180, 182, and 184 provided on the outer surfaces of the first and second sidewalls 121 and 123 are denoted by reference numeral 180' (see FIG. 1). The cover assembly 180' may have a cylindrical shape in which a through-hole through which the shaft support portion 150 passes is formed in the center.

The drying apparatus 1 may be provided with cover assemblies 180a, 182a, and 184a provided on the outer surfaces of the discharge port 133 and the filter device 140. The cover assemblies 180a, 182a, and 184a may include an outer cover 180a, a heat insulating material 182a, and a heat transfer sheet 184a.

The description of the outer cover 180a, the heat insulating material 182a, and the heat transfer sheet 184a may refer to the description of the outer cover 180, the heat insulating material 182, and the heat transfer sheet 184.

The cover assemblies 180, 182, and 184 provided on the main body 100 of the apparatus are referred to as a "first cover assembly", and the cover assemblies 180a, 182a and 184a provided for the exhaust port 135 and the filter device 140 are referred to as "second cover assemblies".

The drying apparatus 1 may include a heater 200 that provides heat to perform a drying process of the powder raw material.

The heater 200 may be provided in at least one of the main body 100 of the apparatus, the discharge port 133, and the exhaust port 135.

The heater 200 may be disposed on the outer surface of the main body 100 of the apparatus. For example, the heater 200 may be wrapped around the outer surface of the main body 100 of the apparatus, disposed to form a zigzag shape (or a meander shape), or disposed to have a vortex shape (a shape in which a top rotates).

The main body 100 of the apparatus may include a plurality of heating regions in which the amount of heat supplied from the heater 200 is independently or individually controlled.

The plurality of heating regions may be defined in the cylindrical portion 110. In the plurality of heating regions, a plurality of heaters independently controlling the heating value may be installed.

Among the plurality of heating regions, some of the heating regions may form a lower heating region positioned below the rotation shaft 155, and other heating regions may form an upper heating region positioned above the rotation shaft 155.

From another point of view, the some heating region of the plurality of heating regions may form the right side heating region positioned adjacent to the first side wall 121 than the second side wall 123 and the other portion of the heating region of the plurality of heating regions may form a left heating region positioned adjacent to the second sidewall 123 than the first sidewall 121, based on the axial center of the cylindrical portion 110.

The cylindrical portion 110 may include partition members 171 and 173 to separate the plurality of heating regions. The partition members 171 and 173 may perform a deformation prevention function to prevent deformation or distortion of the main body 100 of the apparatus when the main body 100 of the apparatus is heated to different temperatures by the heater 200.

The partition members 171 and 173 may include a first partition member 171 protruding from the outer surface of the cylindrical portion 110 and extending in the circumferential direction.

The first partition member 171 may be disposed at a substantially central portion based on the axial length of the cylindrical portion 110.

By the first partition member 171, the heating region of the cylindrical portion 110 may be partitioned into a plurality of heating regions adjacent to each other in the axial direction (left and right direction). The "axial direction" may be understood as a direction from the first sidewall 121 toward the second sidewall 123, that is, a direction in which the rotation shaft 155 extends.

The partition members 171 and 173 may include a second partition member 173 protruding from the outer surface of the cylindrical portion 110 and extending in the axial direction.

The second partition member 173 may be disposed to cross the first partition member 171. By the second partition member 173, the heating region of the cylindrical portion 110 may be partitioned into a plurality of heating regions adjacent to each other in the circumferential direction, that is, a front heating region and a rear heating region, or an upper heating region and a lower heating region.

For example, a plurality of second partition members 173 may be provided.

As illustrated in FIG. 2, the second partition member 173 may include an upper partition member 173a provided at the upper end portion of the cylindrical portion 110, a lower partition member 173b provided at the lower end portion of the cylindrical portion 110, and two side partition members 173c and 173d provided on both sides of the outer circumferential surface of the cylindrical portion 110.

The two side partition members 173c and 173d may include a first side partition member 173c and a second side partition member 173d.

As such, when the four second partition members 173 are provided, the outer circumferential surface of the cylindrical portion 110 may be partitioned into eight heating regions by the first and second partition members 171 and 173.

However, the present disclosure is not limited thereto, and the outer circumferential surface of the cylindrical portion 110 may be partitioned into at least two or more heating regions according to the number of the first and second partition members 171 and 173 provided.

Of course, when only the first partition member 171 is provided and the second partition member 173 is omitted, the heating region may be configured to include two heating region which is partitioned into both sides in the left and right direction with the first partition member 171 as a center.

Hereinafter, an embodiment in which the outer circumferential surface of the cylindrical portion 110 is partitioned into eight heating regions (cylindrical portion heating regions) will be described.

A first heater 201 may be installed in the first heating region of the eight heating regions.

The first heating region is a region in which at least a portion of the first door of the doors 160 is positioned, and is understood as the heating region defined by an upper partition member 173a, a first side partition member 173c, a first partition member 171, and a second side wall 123.

A second heater 202 may be installed in the second heating region of the eight heating regions.

The second heating region is a region in which at least a portion of the second door of the doors 160 is positioned, and is understood as the heating region defined by an upper partition member 173a, a first side partition member 173c, a first partition member 171, and a first side wall 121.

A third heater 203 may be installed in the third heating region of the eight heating regions.

The third heating region is a region in which another portion of the first door is positioned of the doors 160, and is understood as the heating region defined by a lower partition member 173b, a first side partition member 173c, a first partition member 171, and a second side wall 123.

A fourth heater 204 may be installed in a fourth heating region of the eight heating regions.

The fourth heating region is a region in which another portion of the second door of the doors 160 is positioned, and is understood as the heating region defined by a lower partition member 173b, a first side partition member 173c, a first partition member 171, and a first side wall 121.

A fifth heater 205 may be installed in a fifth heating region of the eight heating regions.

The fifth heating region is understood as a heating region defined by the upper partition member 173a, the second side partition member 173d, the first partition member 171, and the first side wall 121.

A sixth heater 206 may be installed in a sixth heating region of the eight heating regions.

The sixth heating region is understood as a heating region defined by the upper partition member 173a, the second side partition member 173d, the first partition member 171, and the second side wall 123.

A seventh heater 207 may be installed in the seventh heating region of the eight heating regions.

The seventh heating region is understood as a heating region defined by the lower partition member 173b, the second side partition member 173d, the first partition member 171, and the first side wall 121.

An eighth heater 208 may be installed in the eighth heating region of the eight heating regions.

The eighth heating region is understood as a heating region defined by the lower partition member 173b, the second side partition member 173d, the first partition member 171, and the second side wall 123.

The first, second, fifth, and sixth heating regions may form an upper heating region, and the third, fourth, seventh, and eighth heating regions may form a lower heating region.

The first to eighth heaters 208 may be disposed by bending in a zigzag shape to provide a sufficient area to each heating region of the cylindrical portion 110.

The main body 100 of the apparatus may further include an additional heating region in which a heater is disposed as a region other than the cylindrical portion 110. In detail, the additional heating region may be defined on the first and second sidewalls 121 and 123.

The additional heating region may include a ninth heating region (a first sidewall heating region) defined on the first sidewall 121, and a ninth heater 209 may be installed in the ninth heating region.

The additional heating region may include a tenth heating region (a second sidewall heating region) defined on the second sidewall 123, and a tenth heater 210 may be installed in the tenth heating region.

A first shaft support portion 151 protrudes from the first sidewall 121, and a second shaft support portion 152 protrudes from the second sidewall 123.

For example, the heater 200 may be disposed to extend in a spiral shape along the circumference of the first and second shaft support portions 151 and 152. In other words, the ninth heater 209 may be disposed to surround the outer circumferential surface of the first shaft support portion 151 and have a spiral shape so as to provide a sufficient area to the ninth heating region.

However, the present disclosure is not limited thereto, and the heater 200 may be disposed in a zigzag shape avoiding the first and second shaft support portions 151 and 152.

The tenth heater 210 may be disposed to surround the outer circumferential surface of the second shaft support portion 152 and to have a vortex shape to provide a sufficient area to the tenth heating region.

The drying apparatus 1 may further include an additional heating region in which a heater is disposed as a region other than the main body 100 of the apparatus. The additional heating region may be formed on a path through which the powder raw material is discharged from the chamber of the main body 100 of the apparatus to the outside or flows into the chamber from the outside.

In detail, the additional heating region may include an eleventh heating region defined on the outer surface of the filter device 140, and an eleventh heater 211 may be installed in the eleventh heating region.

The additional heating region may include a twelfth heating region defined on an outer surface of the discharge port 133, and a twelfth heater 212 may be installed in the twelfth heating region.

The additional heating region may include a thirteenth heating region defined on the outer surface of the discharge port 133, and a thirteenth heater 213 may be installed in the thirteenth heating region.

The eleventh to thirteenth heaters 211, 212, and 213 may be disposed to be wound in a circumferential direction along an outer circumferential surface of each heating region to provide a sufficient area to each heating region.

The first to thirteenth heaters 201 to 213 are independently controlled, and outputs may be controlled to have different heating values or heating temperatures.

The heater 200, that is, the first to thirteenth heaters 201 to 213 may be configured as a cable-type heater to facilitate processing such as bending or rounding according to the shape of each heating region.

For example, the heater 200 may be configured of a mineral insulated heating cable (MI heating cable). The MI heating cable has a maximum using temperature of 600° C., and can achieve stable heat generation. In addition, the MI heating cable has excellent heat resistance and corrosion resistance, so that it can provide a protection function against stress corrosion cracking.

A heater temperature sensor 250 for detecting the temperature of the first to eighth heaters 201 to 208 may be disposed in the first to eighth heating regions. A plurality of heater temperature sensors 250 may be provided, and a plurality of heater temperature sensors 250 may be disposed in the first to thirteenth heating regions.

The heater temperature sensor 250 may be disposed to be in contact with or adjacent to the heater 200 to detect the temperature of the heater 200.

The heater temperature sensor 250 may be disposed at the center of each heating region. Considering the operating characteristics of the heater 200 whose output is controlled at different temperatures, if the heater temperature sensor 250 is disposed adjacent to the edge of each heating region, since the heater temperature sensor is influenced by the adjacent heating region, the temperature cannot be accurately detected.

However, since the door 160 is disposed in the first and second heating regions, it may not be easy for the temperature sensor 250 to be disposed in the center of the first and second heating regions. Accordingly, the temperature sensors 250 disposed in the first and second heating regions may be disposed outside the upper end portion of the door 160.

A chamber temperature sensor 260 for detecting the temperature of the chamber in which the powder raw material is accommodated may be disposed inside the main body 100 of the apparatus.

The chamber temperature sensor 260 may be positioned below the main body 100 of the apparatus. The chamber temperature sensor 260 may be disposed at a lower position than the rotation shaft 155.

For example, the chamber temperature sensor 260 may be disposed on the bottom surface of the cylindrical portion 110. When the drying apparatus 1 is driven and the powdered raw material is agitated in the chamber, most of the powdered raw material may be in a state of being accommodated in the lower portion of the chamber.

Accordingly, it may be advantageous to actually improve drying performance to detect the lower temperature of the chamber in which the powder raw material is positioned and to utilize the detected result value.

A plurality of chamber temperature sensors 260 may be provided. The plurality of chamber temperature sensors 260 may be disposed to be spaced apart from each other in the axial direction (left and right direction) under the main body 100 of the apparatus.

The plurality of chamber temperature sensors 260 may include a first chamber temperature sensor 261 disposed adjacent to the fourth heating region and the seventh heating region, and a second chamber temperature sensor 263 disposed adjacent to the third heating region and the eighth heating region.

The first chamber temperature sensor 261 may be positioned on the left portion of the cylindrical portion 110, and the second chamber temperature sensor 263 may be positioned on the right portion of the cylindrical portion 110.

Considering a chamber having a relatively large volume, a temperature deviation may occur according to the location of the chamber. Due to the temperature deviation, the drying performance of the powder raw material positioned at a relatively low temperature point may be deteriorated.

In order to reduce the temperature deviation, it is possible to check whether the entire chamber is being heated evenly during operation of the drying apparatus by detecting the internal temperature at a plurality of positions in the chamber.

In addition, based on the checked temperature value, outputs of all or some of the heaters among the plurality of heaters 200 may be differently controlled. In other words, it is possible to increase the output of the heater adjacent to one point of the chamber forming a relatively low temperature, and maintain or decrease the output of the heater adjacent to the other point in the chamber forming a relatively high temperature.

For convenience of description, the chamber temperature sensor 260 may be referred to as a "first temperature sensor" and the heater temperature sensor 250 may be referred to as a "second temperature sensor".

Figure 6:
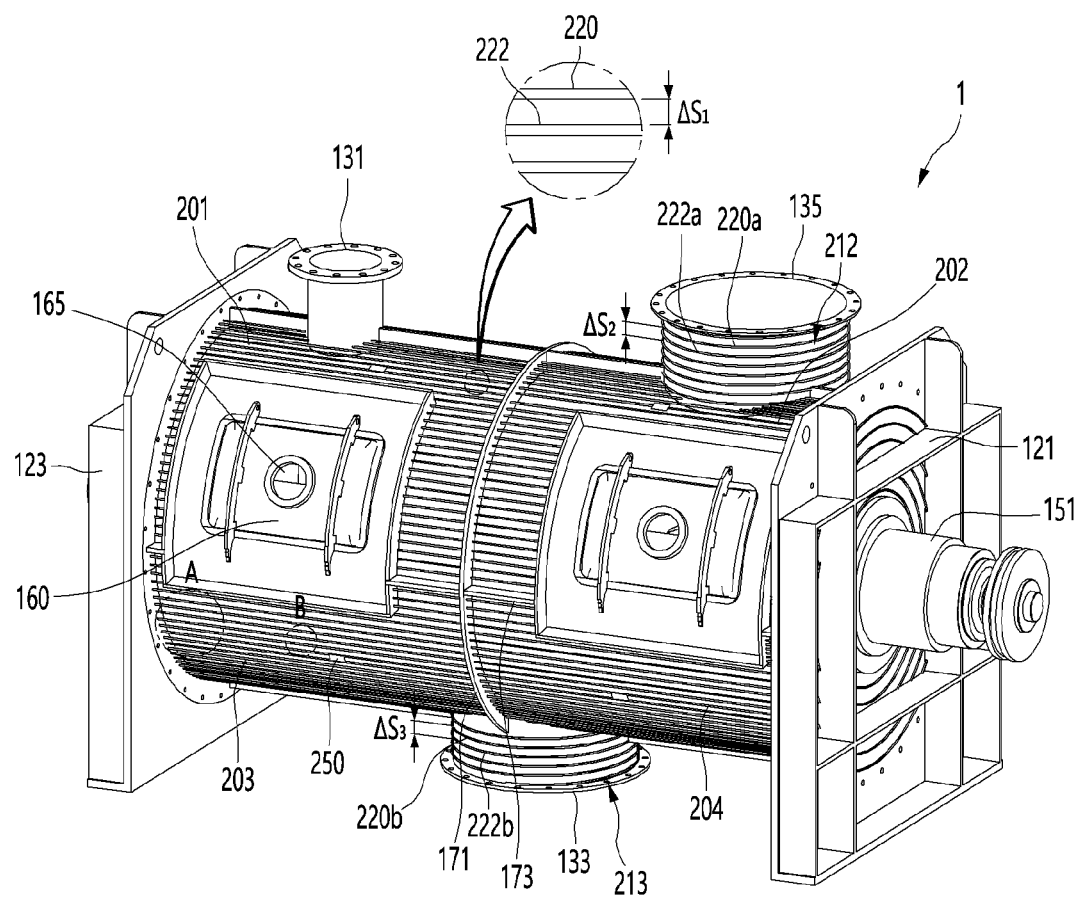
FIG. 6 is a perspective view illustrating the configuration of a main body of the apparatus according to an embodiment of the present disclosure.
Figure 7:
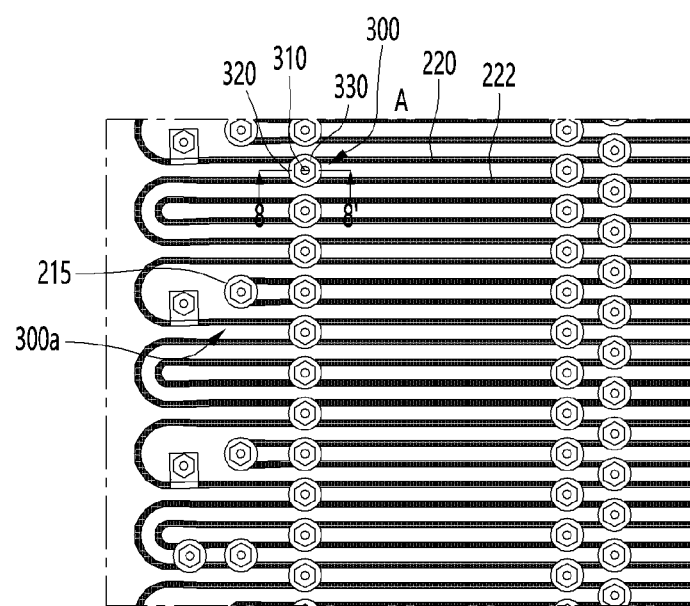
FIG. 7 is an enlarged view of part "A" of FIG. 6.
Figure 8:
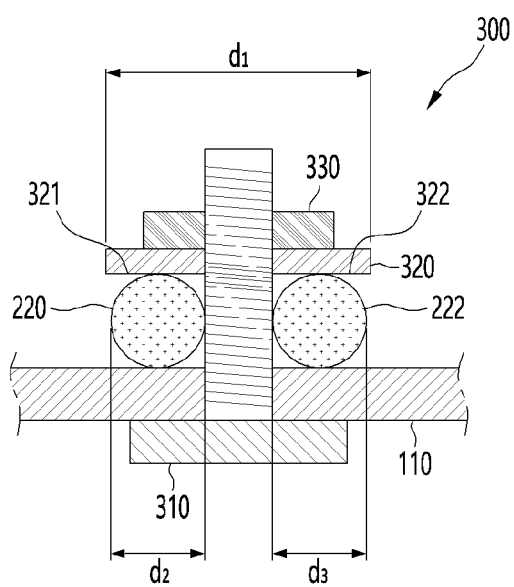
FIG. 8 is a cross-sectional view taken along line 8-8' of FIG. 7.
Figure 9:
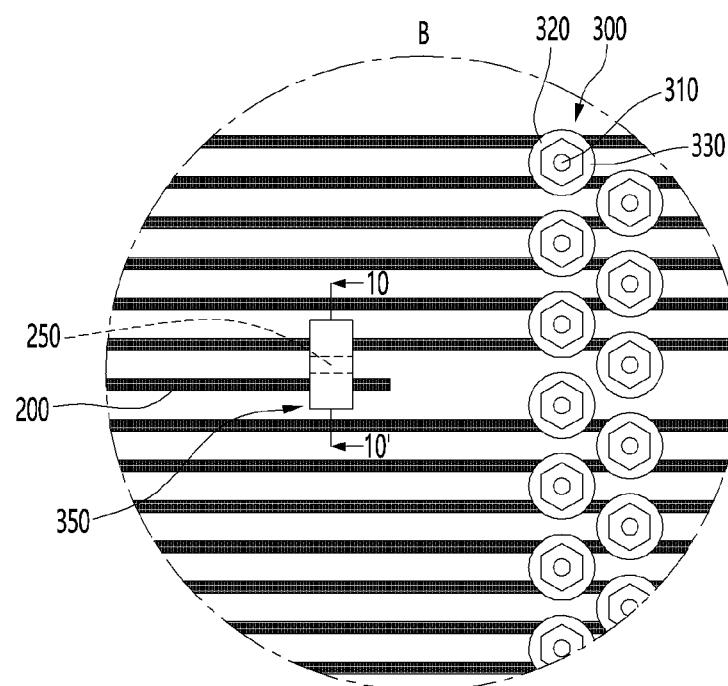
FIG. 9 is an enlarged view of part "B" of FIG. 6.
Figure 10:
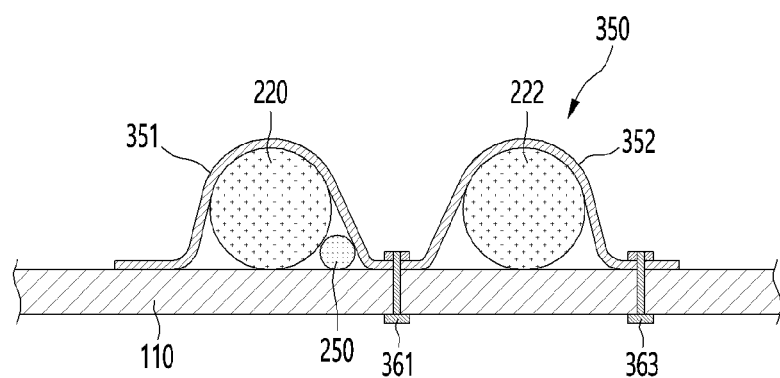
FIG. 10 is a cross-sectional view taken along line 10-10' of FIG. 9.

FIG. 6 is a perspective view illustrating the configuration of a main body of the apparatus according to an embodiment of the present disclosure, FIG. 7 is an enlarged view of part "A" of FIG. 6, FIG. 8 is a cross-sectional view taken along line 8-8' of FIG. 7, FIG. 9 is an enlarged view of part "B" of FIG. 6, and FIG. 10 is a cross-sectional view taken along line 10-10' of FIG. 9.

Referring to FIGS. 6 to 10, the heater 200 according to an embodiment of the present disclosure may include a main body heater installed in the main body 100 of the apparatus and a pot heater installed in a port through which powder raw material or moisture is discharged.

The main body heater may include the first to tenth heaters 201 to 210 described above.

The port heater may include a twelfth heater 212 installed in the discharge port 133 and a thirteenth heater 213 installed in the discharge port 133.

The main body heater is understood as a main heater that provides heat to dry the powder raw material accommodated in the main body 100 of the apparatus, and the output may be controlled to dissipate sufficient heat.

Accordingly, the main body heaters 201 to 210 may be disposed rather densely in the first to tenth heating regions.

On the other hand, the port heaters 212 and 213 are sub-heaters that provide heat to the discharge port 133 or the discharge port 133 positioned on the path of the powder raw material discharged from the chamber after drying is completed, and can provide a level of heat that prevents condensation due to the temperature difference with the outside air.

Accordingly, the pot heaters 212 and 213 may be disposed in a relatively small amount.

In summary, the ratio of the area in which the main body heaters 201 to 210 are disposed per unit area of the installation surface for installing the main body heaters 201 to 210 may be greater than a ratio of an area in which the pot heaters 212 and 213 are disposed per unit area of the installation surface for the installation of the pot heaters 212 and 213.

The "installation surface" may mean a surface on which a heater is installed in each heating region.

The main body heaters 201 to 210 may be disposed in a zigzag shape on the installation surface of each heating region. The main body heaters 201 to 210 may include a plurality of heater lines disposed to form a plurality of rows.

In detail, the main body heaters 201 to 210 may include a first heater line 220 forming a first row and a second heater line 222 extending adjacent to the first heater line 220 and forming a second row. The first and second heater lines 220 and 222 may be disposed to be spaced apart by a first set distance ΔS1.

Among the port heaters 212 and 213, the twelfth heater 212 installed in the exhaust port 135 may be disposed to be wrapped around the outer surface of the discharge port 133 in the circumferential direction. The twelfth heater 212 may be disposed to form a plurality of rows.

In detail, the twelfth heater 212 may include a first heater line 220a forming a first row and a second heater line 222a extending adjacent to the first heater line 220a and forming a second row. The first and second heater lines 220a and 222a may be disposed to be spaced apart by a second set distance ΔS2.

Among the port heaters 212 and 213, the thirteenth heater 213 installed in the discharge port 133 may be disposed to be wrapped around the outer surface of the discharge port 133 in the circumferential direction. The thirteenth heater 213 may be disposed to form a plurality of rows.

In detail, the thirteenth heater 213 may include a first heater line 220b forming a first row and a second heater line 222b extending adjacent to the first heater line 220b and forming a second row. The first and second heater lines 220b and 222b may be disposed to be spaced apart by a third set distance ΔS3.

The first set distance ΔS1 is formed to be smaller than the second set distance ΔS2 or the third set distance ΔS3 so that the installation amount of the main body heater is greater than the installation amount of the pot heaters 212 and 213.

Although not illustrated in FIG. 6, the eleventh heater 211 is installed to be wrapped around the outer circumferential surface of the filter device 140, and the installation amount per unit area of the eleventh heater 211 may be smaller than the installed amount per unit area of the main body heaters 201 to 210.

In addition, the interval between the first and second heater lines constituting the first and second rows of the eleventh heater 211 may be formed to be larger than the interval ΔS1 between the first and second heater lines 220 and 222 constituting the first and second rows of the main body heaters 201 to 210.

The drying apparatus 1 may further include a heater fixing device 300 for fixing the heater 200 to the installation surface of each heating region. The heater 200 needs to be disposed in contact with or adjacent to the installation surface so that the heat generated by the heater 200 is effectively transferred to the installation surface by conduction or radiation.

When the heater 200 is configured as a cable type and disposed to be long, a phenomenon in which the heater 200 is lifted from the installation surface may appear. Accordingly, the heater fixing device 300 may be provided to press the heater 200 toward the installation surface.

The heater fixing device 300 may include a bolt 310 inserted into the installation surface and a washer 320 fitted to the bolt 310 and pressing the outer surface of the heater 200.

The bolt 310 may be inserted from the inside of the installation surface toward the outside of the installation surface. In addition, the bolts 310 may be positioned between the first and second heater lines 220 and 222 forming the first and second rows, that is, in a spaced apart space.

A washer 320 is fitted to the bolt 310 protruding to the outside of the installation surface, and the washer 320 may be disposed to press from the outside of the first and second heater lines 220 and 222 toward the installation surface.

A through-hole into which the bolt 310 is inserted may be formed in the washer 320.

The heater fixing device 300 may further include a nut 330 coupled to the outside of the washer 320 and coupled to the thread of the bolt 310.

Since the nut 330 presses the washer 320 in the direction of the installation surface while the nut 330 is screwed to the bolt 310, the washer 320 can press the heater 200 in the direction of the installation surface.

Referring to FIG. 8, one surface of the washer 320 is configured to contact or press the first and second heater lines 220 and 222. For example, one surface of the washer 320 may form a bottom surface as a pressing surface.

One surface of the washer 320 may include a first part 321 for pressing or contacting the first heater line 220 and a second part 322 for pressing or contacting the second heater line 222.

For example, the outer diameter d1 of the washer 320 may be formed to be larger than the sum of the outer diameter d2 of the first heater line 220 and the outer diameter d3 of the second heater line 222.

According to this configuration, there is an effect that the first and second heater lines constituting the two rows can be stably fixed by one heater fixing device 300.

The heater 200 forms a plurality of rows, and a plurality of fixing devices 300 may be provided to fix the heaters 200 of the plurality of rows to the drying apparatus.

The plurality of fixing devices 300 may be aligned in the outer circumferential direction of the installation surface.

The heater 200 may extend in the axial direction and include a first part constituting the first and second heater lines 220 and 222 and a bending part 215 as a second part that changes the extension direction so as to be easily disposed on the installation surface. A heater fixing device 300a for fixing the bending part 215 to the installation surface may be installed in the bending part 215.

The description of the heater fixing device 300a refers to the description of the heater fixing device 300 described above.

The bending part 215 is configured to connect adjacent first and second heater lines, and the heater fixing device 300a may be configured to be disposed in a concave portion of the bending part 215 to press the adjacent first and second heater lines.

A heater temperature sensor 250 for detecting the temperature of the heater 200 may be disposed in each of the heating regions. The heater temperature sensor 250 may be disposed in contact with or adjacent to the heater 200.

The heater temperature sensor 250 may be disposed to detect the temperature of the first to thirteenth heaters 201 to 213 disposed in the first to thirteenth heating regions.

For example, the heater temperature sensor 250 may include a thermocouple temperature sensor. However, the type of the temperature sensor will not be limited thereto.

The drying apparatus 1 may further include a sensor fixing device 350 for fixing the heater temperature sensor 250 adjacent to the heater 200. The sensor fixing device 350 may be configured to fix the heater 200 and the heater temperature sensor 250 together.

In detail, the sensor fixing device 350 may include a first accommodation portion 351 for fixing the first heater line 220 and the heater temperature sensor 250 constituting the first row of the heater 200 and the heater and a second accommodation portion 352 for fixing the second heater line 222 constituting the second row of the heater 200.

The first accommodation portion 351 may protrude from the installation surface and have a shape recessed upward to accommodate the first heater line 220 and the heater temperature sensor 250 therein. The first accommodation portion 351 may be configured to press the first heater line 220 in the direction of the installation surface.

The second accommodation portion 352 may have a shape that protrudes from the installation surface and is recessed upward to accommodate the second heater line 222 therein. The second accommodation portion 352 may be configured to press the second heater line 222 in the direction of the installation surface.

The first accommodation portion 351 and the second accommodation portion 352 may be integrally configured.

The drying apparatus 1 may further include fastening mechanisms 361 and 363 for fastening the sensor fixing device 350 to the installation surface. For example, the fastening mechanisms 361 and 363 may include screws.

The fastening mechanisms 361 and 363 may include the first fastening mechanism 361 fastened to the connection portion between the first accommodation portion 351 and the second accommodation portion 352 and the second fastening mechanism 363 fastened to the outside of the second accommodation portion 352. The second accommodation portion 352 may be positioned between the first and second fastening mechanisms 361 and 363.

Figure 11:
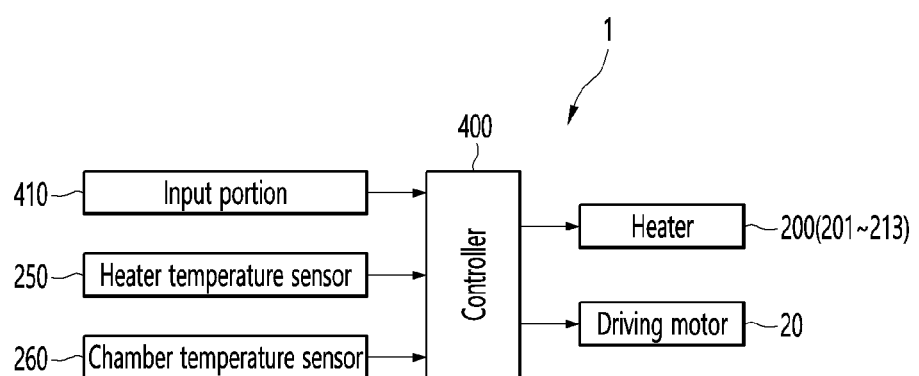
FIG. 11 is a block diagram illustrating a control configuration of a drying apparatus according to an embodiment of the present disclosure.
Figure 12:
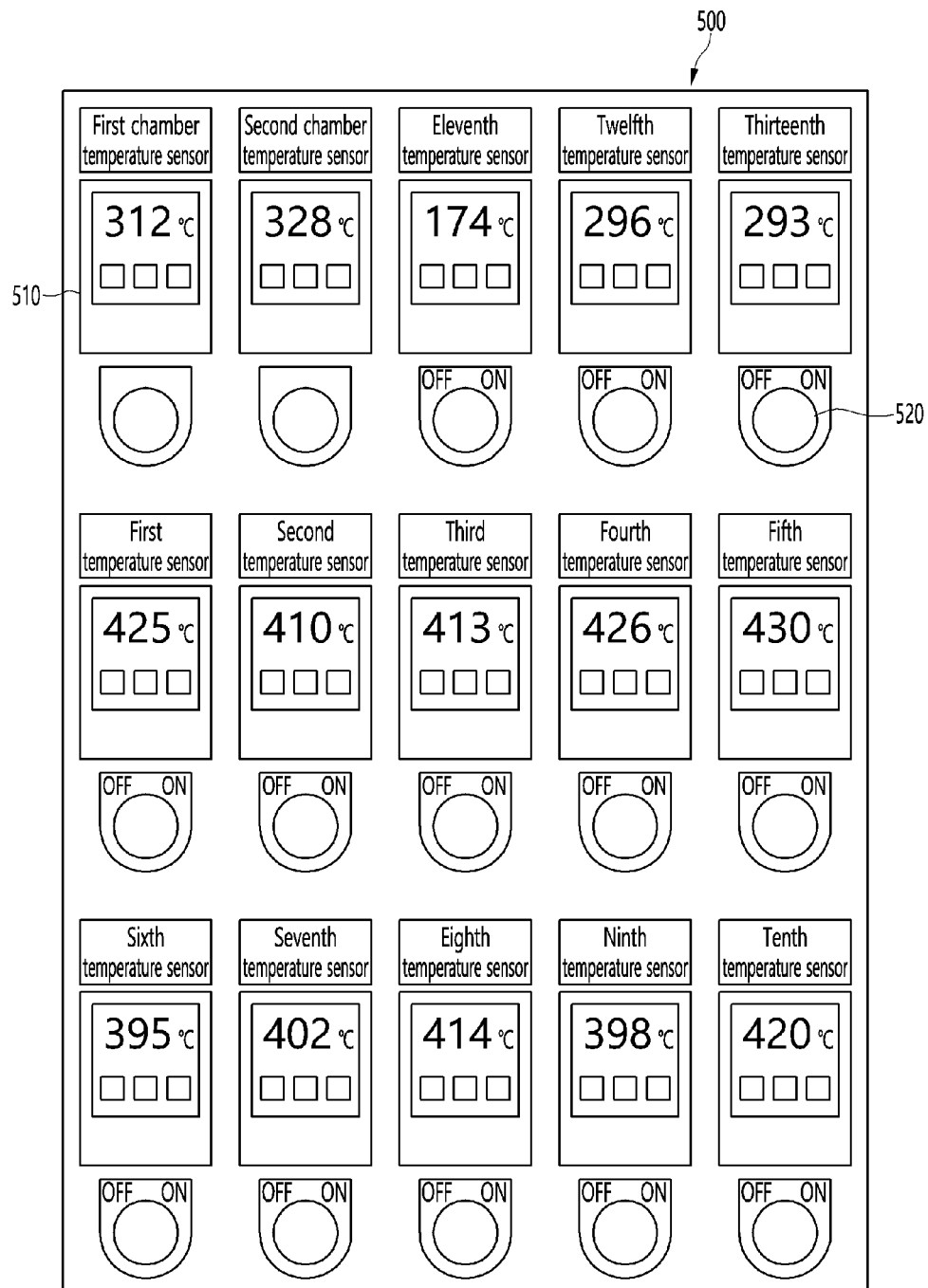
FIG. 12 is a view illustrating the configuration of a control panel according to an embodiment of the present disclosure.
Figure 13:
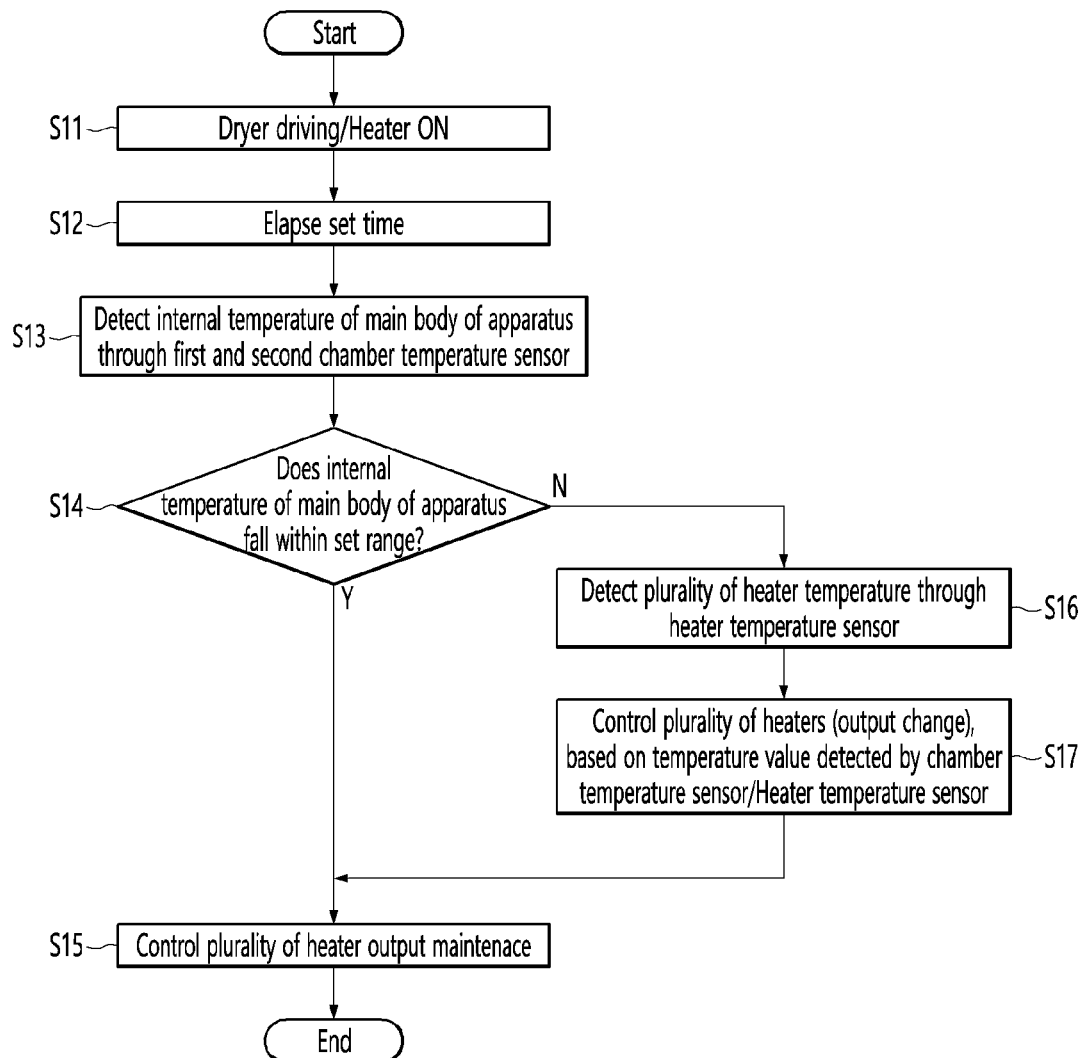
FIG. 13 is a flowchart illustrating a method for controlling a drying apparatus according to an embodiment of the present disclosure.
Figure 14:
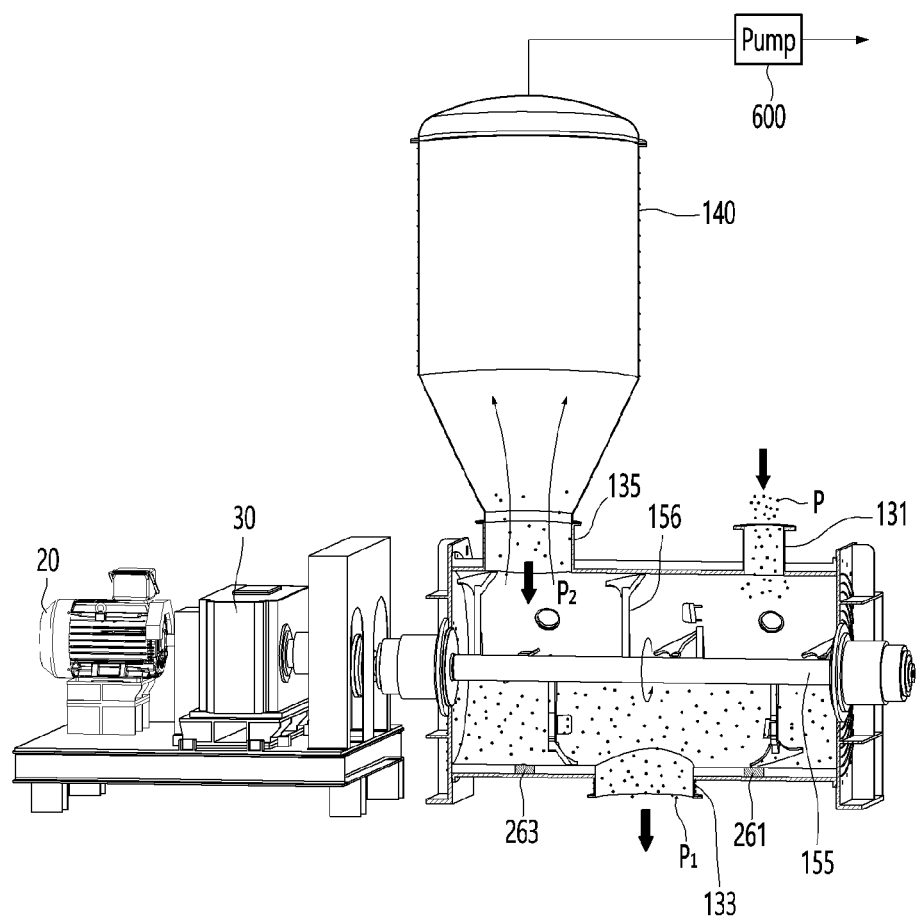
FIG. 14 is a cross-sectional view illustrating a state where the drying apparatus is operated according to the embodiment of the present disclosure.

FIG. 11 is a block diagram illustrating a control configuration of a drying apparatus according to an embodiment of the present disclosure, FIG. 12 is a view illustrating the configuration of a control panel according to an embodiment of the present disclosure, FIG. 13 is a flowchart illustrating a method for controlling a drying apparatus according to an embodiment of the present disclosure, and FIG. 14 is a cross-sectional view illustrating a state where the drying apparatus is operated according to the embodiment of the present disclosure.

Referring first to FIG. 11, the drying apparatus 1 according to the embodiment of the present disclosure may include an input portion 410 capable of inputting a predetermined command to operate the drying apparatus 1. The input portion 410 may include, for example, a start input portion for inputting an operation start command of the drying apparatus 1 and a heater on/off input portion for starting or stopping the operation of the heater 200.

The drying apparatus 1 may include a heater temperature sensor 250 disposed outside the main body 100 of the apparatus and for detecting the temperature of the heater 200 and a chamber temperature sensor 260 disposed inside the main body 100 of the apparatus and for detecting the temperature inside the chamber.

The drying apparatus 1 may further include a controller 400 that adjusts the output of the heater 200 based on the temperature values detected by the heater temperature sensor 250 and the chamber temperature sensor 260.

Referring to FIG. 12, the drying apparatus 1 may further include a control panel 500 that can be manipulated by a user and can check operation information of the drying apparatus 1.

The control panel 500 may include a display portion 510 which displays the temperature values detected by the first and second chamber temperature sensors 261,263 and the temperature values detected by the heater temperature sensor 250 corresponding to the first to thirteen heaters 201 to 213.

It should be noted in advance that the temperature values displayed on the display portion 510 of FIG. 12 are displayed as an example and are not limited to this temperature value.

When the temperature value detected by the first and second chamber temperature sensors 261,263 or the temperature value detected by the heater temperature sensor 250 is out of the set temperature range for more than a predetermined time, the display portion 510 may output a warning message indicating "an abnormal temperature state" by voice or visually.

Through this, the user can check whether the heater 200 or the temperature sensors 250 and 260 are faulty.

The control panel 500 may further include an on/off input portion 520 capable of starting or stopping the driving of the first to thirteenth heaters 201 to 213. The user may manually control the operation of the first to thirteenth heaters 201 to 213 by manipulating the on/off input portion 520.

Of course, whether the first to thirteen heaters 201 to 213 are turned on/off and the output amount control may be performed by preset control logic. Hereinafter, a control method related thereto will be described with reference to the drawings.

Referring to FIGS. 13 and 14 together, when the driving of the drying apparatus 1 is started, the powder raw material P is input through the input port 131 and the driving motor 20 can be driven to rotate the rotary shaft 155. The blade 156 is rotated according to the rotation of the rotation shaft 155 so that the powder raw material accommodated in the main body 100 of the apparatus may be agitated.

The heater 200 may be turned on and operated. For example, when the drying apparatus 1 is initially driven, the first to thirteen heaters 201 to 213 may operate at a set output.

For example, among the first to thirteen heaters 201 to 213, the first to ten heaters 201 to 210 provided in the main body 100 of the apparatus operate with a first output, and the eleventh to thirteenth heaters 211 to 213 provided to ports 133 and 135 and a filter device 140 may operate with the second output. The first output may be higher than the second output (S11).

When the set time elapses, the temperature inside the main body 100 of the apparatus may be detected through the first and second chamber temperature sensors 261, 263.

In this case, the set time may be a preset time in which it is determined that the chamber temperature inside the drying apparatus can reach a desired temperature range after the heater is driven. For example, the set time may be 5 to 10 minutes (S12, S13).

It can be recognized whether the internal temperature of the main body 10 of the apparatus falls within a set range. Specifically, it may be recognized whether the first temperature value detected by the first and second chamber temperature sensors 261,263, respectively, falls within a set range. In addition, it can be recognized whether the deviation of the plurality of first temperature values is formed within the set deviation.

For example, when the temperature value detected by the first chamber temperature sensor 261 is T1 and the temperature value detected by the second chamber temperature sensor 263 is T2, in a case where the T1 and T2 fall within set ranges of the chamber (for example, 450 to 500° C.), the deviation of T1 and T2 can be recognized.

When the deviation of T1 and T2 is formed within a set deviation (for example, within 20° C.), it may be recognized that the internal chamber temperature of the main body 100 of the apparatus falls within a set range. In this case, the operation of the drying apparatus may be continued by maintaining the output of the first to thirteen heaters 201 to 210 (S14 and S15).

On the other hand, when the temperature value of at least one of the detected temperature value T1 and the detected temperature value T2 is out of the set range, or when the deviation between T1 and T2 is out of the set deviation, temperatures of the plurality of heaters 201 to 213 may be detected through the heater temperature sensor 250 (S16).

Based on the temperature values detected by the chamber temperature sensor 260 and the heater temperature sensor 250, at least one of the plurality of heaters 201 to 213 may be controlled. For example, the output of at least one of the plurality of heaters 201 to 213 may be changed (S17).

The specific control method is as follows.

(1) When at least one of the detected temperature values T1 and T2 is out of the set range If the temperature value T1 detected by the first chamber temperature sensor 261 is equal to or less than the set range, since the temperature of the left region of the chamber is low, the output of a heater positioned in a heating area adjacent to the left region, for example, the first, third, sixth, and eighth heaters 201, 203, 206, 208 and the tenth heater 210 positioned on the second sidewall 123 may be controlled to increase.

At this time, among the first, third, sixth, eighth, and tenth heaters 201, 203, 206, 208 and 210, the output of the heater detected as having the lowest temperature value through the heater temperature sensor 250 may increase the most.

Additionally, the outputs of the third and eighth heaters 204 and 207 positioned in the lower heating region of the main body 100 of the apparatus can be controlled to be larger than the output of the first and sixth heaters 202 and 205 so that the temperature of the lower portion of the chamber in which the raw material powder is mostly accommodated further increase.

On the other hand, if the temperature value T1 detected by the second chamber temperature sensor 263 is equal to or less than the set range, since the temperature of the right region of the chamber is low, the output of the heater positioned on the heating region adjacent to the right region, for example, the second, fourth, fifth, seventh heaters 202, 204, 205, 207 and the ninth heater 209 positioned in the first sidewall 121 may be controlled to increase.

At this time, among the second, fourth, fifth, seventh, and ninth heaters 202, 204, 205, 207 and 209, the output of the heater detected as having the lowest temperature value through the heater temperature sensor 250 may increase the most.

Additionally, the outputs of the fourth and seventh heaters 204 and 207 positioned in the lower heating region of the main body 100 of the apparatus can be controlled to be larger than the output of the second and fifth heaters 202 and 205 so that the temperature of the lower portion of the chamber in which the raw material powder is mostly accommodated further increase.

Conversely, when the temperature values T1 and T2 are higher than the set range, the output of the heater positioned in the corresponding heating region may be reduced by the above logic.

(2) When the deviation of the detected temperature values T1 and T2 is out of the set deviation When the temperature values T1 and T2 detected by the first and second chamber temperature sensors 261,263 are within the set range, but the deviation thereof is out of the set deviation, the output of the heater positioned adjacent to the heating region having a high temperature value may be controlled to decrease or the output of a heater positioned adjacent to a heating region having a low temperature value may be controlled to increase.

In other words, in the above description, when the temperature of the left region is relatively high and the temperature of the right region is relatively low, the output of at least one of the first, third, sixth, eighth, and tenth heaters 201, 203, 206, 208, 210 is lowered, or the output of at least one of the second, fourth, fifth, seventh, and ninth heaters 202, 204, 205, 207, and 209 may increase.

Conversely, when the temperature of the right region is relatively high and the temperature of the left region is relatively low, the output of at least one of the first, third, sixth, eighth, and tenth heaters 201, 203, 206, 208, 210 may increase, or the output of at least one of the second, fourth, fifth, seventh, ninth heaters 202, 204, 205, 207, 209 may decrease (S16, S17).

Meanwhile, the outputs of the eleventh to thirteenth heaters 211 to 213 provided to the ports 133 and 135 and the filter device 140 may be constantly maintained.

In this way, based on the first temperature value detected by the first and second chamber temperature sensors 261, 263 and the second temperature value detected by the heater temperature sensor 250, the outputs of the plurality of heaters 201 to 213 may be changed to decrease the temperature deviation for each location of the drying chamber and form a uniform temperature throughout.

The dried powder P1 may be discharged to the outside of the main body 100 of the apparatus through the discharge port 133. While the drying process is performed, the discharge port 133 may be closed by an opening/closing mechanism (not illustrated), and after drying is completed, the discharge port 133 may be opened while the discharge process is performed.

The powder raw material P2 discharged to the exhaust port 135 together with the air may be filtered by the filter device 140, and may fall into the chamber of the main body 100 of the apparatus by its own weight.

Figure 15:
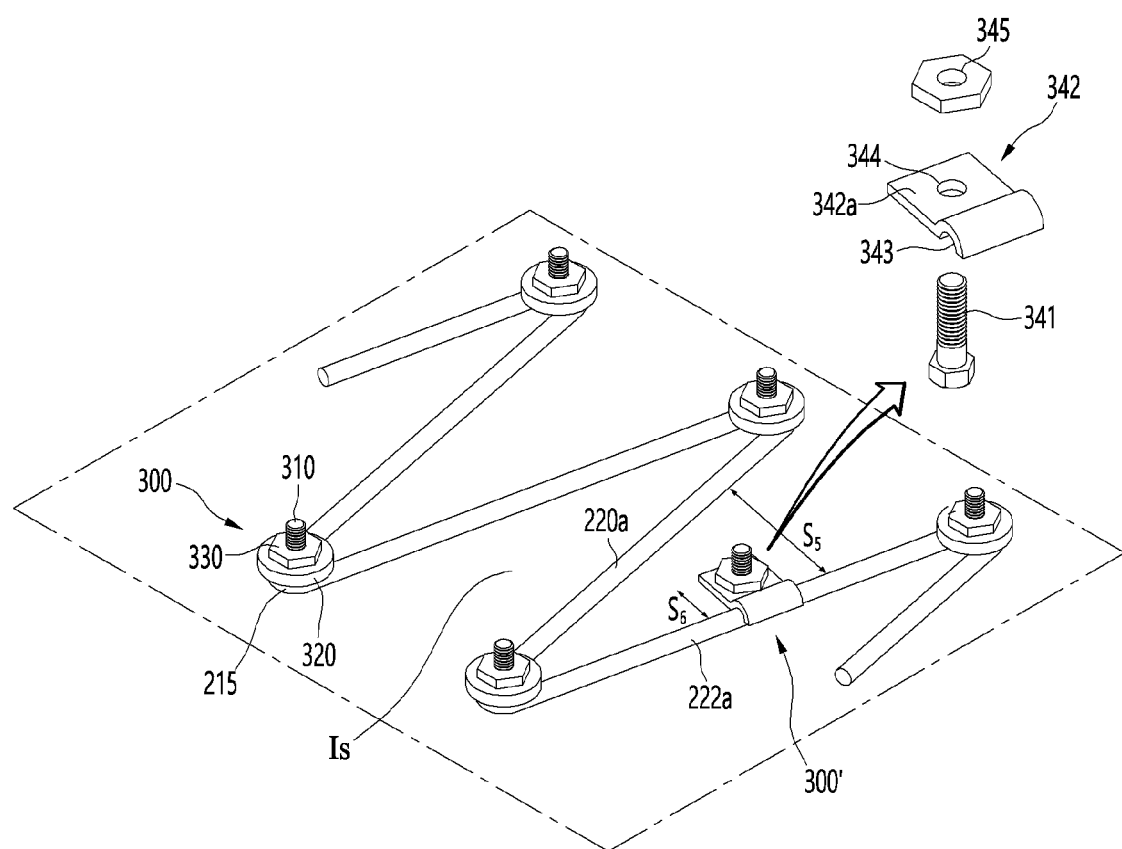
FIG. 15 is a schematic diagram illustrating the configuration of a heater and a heater fixing device according to another embodiment of the present disclosure.

FIG. 15 is a schematic diagram illustrating the configuration of a heater and a heater fixing device according to another embodiment of the present disclosure.

Referring to FIG. 15, a heater fixing device 300' having a different structure for fixing the heater 200 to the installation surface Is of the drying apparatus according to the embodiment of the present disclosure may be provided.

The heater 200 may include linear parts 220a and 222a that extend linearly and a bending part 215 that is bent to change the extension direction of the heater 200.

The bending part 215 may be provided with the heater fixing device 300 described with reference to FIGS. 7 to 8. The heater fixing device 300 may include a bolt 310, a washer 320, and a nut 330. The description of the heater fixing device 300 may refer to the descriptions of FIGS. 7 to 8.

The linear parts 220a and 222a may include a first heater line 220a and a second heater line 222a spaced apart from each other. For example, the first and second heater lines 220a and 222a may be spaced apart by a set distance S5 and extend in parallel.

The drying apparatus may include a heater fixing device 300' for fixing the linear parts 220a and 222a to the installation surface Is.

The heater fixing device 300' may include a bolt 341 inserted into the installation surface Is and a bracket 342 that is inserted into the bolt 341 and covers the outer surface of the heater 200.

The bolt 341 may be inserted from the inside of the installation surface toward the outside of the installation surface. In addition, the bolt 341 may be positioned between the first and second heater lines 220a and 222a forming the first and second rows, that is, in a spaced apart space.

A bracket 342 may be fitted to the bolt 341 protruding to the outside of the installation surface, and the bracket 342 may be disposed to cover at least a portion of the heater 200 and at least a portion of the installation surface.

The bracket 342 may include a groove portion 343 having a shape recessed upward to cover at least a portion of the bracket main body 342a and the heater 200.

The width S6 of the bracket main body 342a may be smaller than the spaced distance S5 of the first and second heater lines 220a and 222a so that the bracket main body 342a can be placed between the first and second heater lines 220a and 222a.

A through-hole 344 into which the bolt 341 is inserted may be formed in the bracket 342.

The heater fixing device 300' may further include a nut 345 coupled to the outside of the bracket 342 and coupled to the thread of the bolt 341.

Since the nut 345 presses the bracket 342 in the direction of the installation surface in the process of being screwed to the bolt 341, the bracket 342 presses the heater 200 in the direction of the installation surface or can be fixed securely to the heater 200.

The invention claimed is:

1. A drying apparatus for a powder raw material for manufacturing a secondary cell with an electric heater, the drying apparatus comprising:
a main body forming a chamber in which the powder raw material is accommodated;
a rotation shaft provided rotatably inside the main body and on which a blade is mounted for agitation of the powder raw material; and
the electric heater installed on an outer surface of the main body and providing heat so that the powder raw material is dried;
a plurality of heater temperature sensors installed on the outer surface of the main body and configured to detect the temperature of the electric heater; and
a sensor fixing device configured to fix the heater temperature sensors to the main body so that the heater temperature sensors is placed in contact with the electric heater or adjacent to the electric heater,
wherein the main body includes a cylindrical portion accommodating the rotation shaft and having a cylindrical shape, and first and second sidewalls forming both sidewalls of the cylindrical portion,
wherein the cylindrical portion and the first and second sidewalls include a plurality of heating regions partitioned to be heated by the electric heater, and
wherein the electric heater includes a plurality of heaters disposed in the plurality of heating regions and independently controllable with different outputs from each other,
wherein the electric heater is wrapped around an installation surface of the main body, extended by bending, or installed to be round with a spiral shape such that the electric heater includes a first heater line and a second heater line,
wherein the sensor fixing device includes a first accommodation portion accommodating the first heater line of the electric heater and the heater temperature sensors and a second accommodation portion accommodating the second heater line of the electric heater, and
wherein the first and second accommodation portions are fastened to the main body through a fastening mechanism.

2. The drying apparatus of claim 1,
wherein the cylindrical portion includes:
- a lower heating region defining a portion of the plurality of heating regions and positioned below the rotation shaft; and
- an upper heating region defining another portion of the plurality of heating regions and is positioned vertically above the rotation shaft, wherein the plurality of heaters are configured such that a heater installed in the lower heating region and a heater installed in the upper heating region are independently controlled.

3. The drying apparatus of claim 1,
wherein the cylindrical portion includes:
- a right heating region defining a portion of the plurality of heating regions and positioned closer to the first sidewall than the second sidewall with respect to an axial center of the cylindrical portion; and
- a left heating region defining another portion of the plurality of heating regions and positioned closer to the second sidewall than the first sidewall with respect to the axial center of the cylindrical portion, wherein the plurality of heaters are configured such that a heater installed in the right heating region and a heater installed in the left heating region are independently controlled.

4. The drying apparatus of claim 1,
wherein the plurality of heating regions include at least two cylindrical portion heating regions formed in the cylindrical portion, a first sidewall heating region formed on the first sidewall, and a second sidewall heating region formed on the second sidewall, and, wherein the plurality of heaters are installed in the cylindrical portion heating region, the first sidewall heating region and the second sidewall heating region.

5. The drying apparatus of claim 4,
wherein the cylindrical portion heating region includes
- a first heating region adjacent to the second sidewall with respect to the axial center of the cylindrical portion and formed at a position higher than the rotation shaft;
- a second heating region adjacent to the first sidewall with respect to the axial center of the cylindrical portion and formed at a position higher than the rotation shaft;
- a third heating region adjacent to the second sidewall with respect to the axial center of the cylindrical portion and formed at a position lower than the rotation shaft; and
- a fourth heating region adjacent to the first sidewall with respect to the axial center of the cylindrical portion and formed at a lower position than the rotation shaft.

6. The drying apparatus of claim 5,
wherein the output amount of the plurality of heaters disposed in the third and fourth heating regions is formed to be greater than the output amount of the plurality of heaters disposed in the first and second heating regions.

7. The drying apparatus of claim 5,
wherein the first, second, third and fourth heating regions form a front portion of the cylindrical portion,
wherein the cylindrical portion heating region formed in a rear portion of the cylindrical portion includes:
- a fifth heating region adjacent to the first sidewall with respect to the axial center of the cylindrical portion and formed at a position higher than the rotation shaft;
- a sixth heating region adjacent to the second sidewall with respect to the axial center of the cylindrical portion and formed at a position higher than the rotation shaft;
- a seventh heating region adjacent to the first sidewall with respect to the axial center of the cylindrical portion and formed at a position lower than the rotation shaft; and
- an eighth heating region adjacent to the second sidewall with respect to the axial center of the cylindrical portion and formed at a position lower than the rotation shaft.

8. The drying apparatus of claim 7,
wherein the output amount of the plurality of heaters disposed in the seventh and eighth heating regions is formed to be greater than the output amount of the plurality of heaters disposed in the fifth and sixth heating regions.

9. The drying apparatus of claim 4,
wherein the cylindrical portion includes:
- a partition member that protrudes from the outer circumferential surface of the cylindrical portion and is configured to partition the at least two cylindrical portion heating regions.

10. The drying apparatus of claim 9,
wherein the partition member includes:
- a first partition member extending from the outer circumferential surface of the cylindrical portion in a circumferential direction to divide the outer circumferential surface of the cylindrical portion in left and right directions; and
- a second partition member disposed to intersect the first partition member to divide the outer circumferential surface of the cylindrical portion in a vertical direction or front and rear directions.

11. The drying apparatus of claim 10,
wherein a plurality of second partition members are provided.

12. The drying apparatus of claim 10,
wherein at least one of the at least two cylindrical portion heating regions is a heating region defined by the first and second partition members and the first sidewall, and
wherein at least the other one of the at least two cylindrical portion heating regions is a heating region defined by the first and second partition members and the second sidewall.

13. The drying apparatus of claim 1, further comprising:
an input port provided at an upper end of the main body and configured to introduce a powder raw material into the chamber;
a discharge port provided at the lower end of the main body and configured to discharge the powder raw material dried in the chamber;
an exhaust port provided at an upper end of the main body and configured to discharge moisture or air from the chamber; and
a filter device connected to the exhaust port and configured to collect the powder raw material discharged through the exhaust port, and
wherein the electric heater is further disposed in at least one of the discharge port, the exhaust port and the filter device.

14. The drying apparatus of claim 13,
wherein, with respect to a first installation surface of the main body on which the electric heater is installed, the amount of the electric heater installed per unit area of the first installation surface is,
with respect to a second installation surface of the at least one of the discharge port, the exhaust port and the filter device, greater than the amount of the electric heater installed per unit area of the second installation surface.

15. The drying apparatus of claim 13,
wherein the output of the electric heater installed in the main body is greater than the output of the electric heater installed in the at least one of the discharge port, the exhaust port and the filter device.

16. The drying apparatus of claim 1, wherein the electric heater includes a cable-type heater.

17. The drying apparatus of claim 16,
wherein the electric heater comprises a mineral insulated heating cable.

18. The drawings apparatus of claim 1,
wherein the electric heater includes:
a first part extending in the axial direction to have a zigzag shape and including the first and second heater lines; and
a second part having a bending part bent to change the extension direction in the first part.

19. The drying apparatus of claim 1,
wherein the heater fixing device for fixing the electric heater to the main body of the apparatus includes
a bolt inserted into the installation surface of the main body and disposed between first and second heater lines spaced apart from each other;
a washer into which the bolt is inserted and which covers at least a portion of the first and second heater lines; and
a nut fastened to the bolt and presses the washer toward the first and second heater lines.

20. The drying apparatus of claim 19, wherein an outer diameter d1 of the washer is formed to be larger than the sum of an outer diameter d2 of the first heater line and an outer diameter d3 of the second heater line.

21. The drying apparatus of claim 1,
wherein the heater fixing device for fixing the electric heater to the main body of the apparatus includes:
a bolt inserted into the installation surface of the main body and disposed between first and second heater lines spaced apart from each other;
a bracket into which the bolt is inserted and forming a groove portion covering at least a portion of the first heater line; and
a nut fastened to the bolt and pressing the bracket toward the first heater line.

22. The drying apparatus of claim 1, further comprising:
a chamber temperature sensor disposed in the chamber of the main body to detect the temperature of the chamber,
wherein the plurality of heaters are disposed in the plurality of heating regions to output different outputs from each other based on the temperature value detected by the chamber temperature sensor.

23. The drying apparatus of claim 22, wherein the chamber temperature sensor is installed at a position lower than the rotation shaft so as to detect the temperature of the lower region of the chamber.

24. The drying apparatus of claim 22, wherein the chamber temperature sensor includes:
a first chamber temperature sensor disposed in a region closer to the second sidewall than the first sidewall with respect to the axial center of the main body of the apparatus; and
a second chamber temperature sensor disposed in a region closer to the first sidewall than the second sidewall with respect to the axial center of the main body of the apparatus.

25. The drying apparatus of claim 24, wherein the plurality of heater temperature sensors disposed in the plurality of heating regions and configured to detect the temperature of the plurality of heaters,
wherein the plurality of heaters are disposed in the plurality of heating regions to output different outputs from each other based on the temperature values detected by the first and second chamber temperature sensors and the plurality of heater temperature sensors.

26. The drying apparatus of claim 25, further comprising:
a controller for controlling the plurality of heaters based on the temperature values detected by the first and second chamber temperature sensors and the plurality of heater temperature sensors,
wherein when it is recognized that the temperature value detected by the first chamber temperature sensor or the second chamber temperature sensor is out of a predetermined range,
the controller controls the plurality of heaters, to change the output value of the plurality of heaters positioned in the heating region adjacent to the installation surface of the first chamber temperature sensor or the second chamber temperature sensor out of the predetermined range.

27. The drying apparatus of claim 26, wherein when it is recognized that the deviation of the temperature values T1 and T2 detected by the first and second chamber temperature sensors is out of a predetermined deviation,
the controller controls the plurality of heaters, to decrease the output of the plurality of heaters positioned adjacent to the heating region having a higher temperature value or to increase the output of the plurality of heaters positioned adjacent to the heating region having a lower temperature value, among the detection values of the first and second chamber temperature sensors.

28. The drying apparatus of claim 1, further comprising:
an outer cover covering the main body;
a heat insulating material provided inside the outer cover and preventing heat generated by the plurality of heaters from being radiated to the outside; and
a heat transfer sheet provided between the heat insulating material and the plurality of heaters and configured to transfer the heat generated by the plurality of heaters to the main body.

29. The drying apparatus of claim 28, wherein, the main body is made of a stainless steel material and the heat transfer sheet is made of an aluminum material such that the heat transfer rate of the heat transfer sheet is greater than the heat transfer rate of the main body.

* * * * *